(12) United States Patent
Inaba et al.

(10) Patent No.: US 8,328,590 B2
(45) Date of Patent: Dec. 11, 2012

(54) OUTBOARD MOTOR

(75) Inventors: Takeshi Inaba, Saitama (JP); Makoto Yazaki, Saitama (JP); Makoto Yonezawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 460 days.

(21) Appl. No.: 12/626,118

(22) Filed: Nov. 25, 2009

(65) Prior Publication Data

US 2010/0147246 A1   Jun. 17, 2010

(30) Foreign Application Priority Data

Dec. 12, 2008   (JP) ................. 2008-317694
Dec. 12, 2008   (JP) ................. 2008-317698
Dec. 12, 2008   (JP) ................. 2008-317699

(51) Int. Cl.
*F02M 35/16*  (2006.01)

(52) U.S. Cl. .................................... 440/88 A

(58) Field of Classification Search ............... 440/88 A, 440/88 R
See application file for complete search history.

(56) References Cited

U.S. PATENT DOCUMENTS

| 5,340,343 | A | 8/1994 | Kawamukai et al. |
| 6,655,338 | B2 | 12/2003 | Tsubouchi et al. |
| 7,114,478 | B2 * | 10/2006 | Miyashita ............... 123/184.47 |
| 7,238,069 | B2 | 7/2007 | Ito et al. |
| 2002/0104502 | A1 | 8/2002 | Tsubouchi et al. |
| 2006/0116035 | A1 | 6/2006 | Ito et al. |

FOREIGN PATENT DOCUMENTS

| JP | 05-286490 A | 11/1993 |
| JP | 2000-016389 A | 1/2000 |
| JP | 2002-235621 A | 8/2002 |
| JP | 2004-239156 A | 8/2004 |
| JP | 2006-242048 A | 4/2006 |
| JP | 2006-151242 A | 6/2006 |

* cited by examiner

*Primary Examiner* — Lars A Olson
*Assistant Examiner* — Andrew Polay
(74) *Attorney, Agent, or Firm* — Westerman, Hattori, Daniels & Adrian, LLP

(57) ABSTRACT

An outboard motor S has an upstream intake silencer with an upstream expansion chamber, and a downstream intake silencer disposed under the upstream intake silencer. The upstream expansion chamber has a lower wall of a stepped shape including a raised part overlapping the downstream intake silencer in a plane and a lowered part without overlapping with the downstream intake silencer in a plane and at a level lower than that of the raised part. An upstream outlet passage of the upstream intake silencer is formed in the raised part. The downstream intake silencer has a stepped upper wall having a raised part, and a lowered part underlying the lower wall of the upstream expansion chamber in a plane and extending at a level lower than that of the raised part.

11 Claims, 16 Drawing Sheets

OUTBOARD MOTOR

BACKGROUND OF THE INVENTION

1. Field of the Invention

The present invention relates to an outboard motor including an internal combustion engine having a combustion chamber or chambers and provided with an intake silencer for reducing intake noise.

2. Description of the Related Art

A known outboard motor disclosed in, for example JP 2002-235621 A or JP 5-286490 A includes an intake silencer disposed in an engine compartment formed by an engine cover.

When an outboard motor including an internal combustion engine is provided with a single intake silencer, intake noise resulting from the pulsation of intake air taken in by the internal combustion engine cannot be satisfactorily and effectively reduced. Intake noise may be satisfactorily and effectively reduced if the outboard motor is provided with a plurality of intake silencers. However, the plurality of intake silencers simply incorporated into the outboard motor increase the size of the outboard motor.

A known outboard motor disclosed in, for example JP5-286490A, JP 2006-151242A or U.S. Pat. No. 3,610,198 includes an internal combustion engine provided with an intake system for carrying intake air for combustion into a combustion chamber or chambers, an engine cover forming an engine compartment in which the internal combustion engine is placed, a top cover covering the engine cover from above. In this outboard motor, intake air taken into an air-intake space defined by the engine cover and the top cover is carried into the intake system disposed in the engine compartment. Water that has entered the air-intake space is restrained from flowing into the intake system together with intake air.

When the intake system of the outboard motor placed in the engine compartment opens into the air-intake space outside the engine compartment, intake air taken into the intake system is of a temperature lower than the temperature of intake air taken into the engine compartment and heated by heat radiated from the internal combustion engine. The internal combustion engine can thus be charged at high charging efficiency and the internal combustion engine can achieve high output performance and lower temperature intake air is taken into the intake system.

However, when the intake system opens into the air-intake space outside the engine compartment, the intake pulsation caused by the internal combustion engine is transmitted through the intake system to the air-intake space. Since the air-intake space is defined by the top cover and the engine cover, the engine cover is vibrated by the intake pulsation transmitted to the air-intake space to generate noise.

In the known outboard motor referred to above, the intake system is provided with a water-stopping member for restraining water that has entered the air-intake space together with intake air from flowing into the intake system together with intake air.

In this known outboard motor, the air-intake opening and the intake system are connected by a labyrinthine air-intake passage to prevent water from mixing in intake air. However, the labyrinthine air-intake passage increases intake resistance, which deteriorates the output performance of the internal combustion engine.

SUMMARY OF THE INVENTION

The present invention has been made in view of the foregoing problems in the prior art and it is therefore an object of the present invention to provide an outboard motor having upstream and downstream intake silencers respectively having a stepped lower wall and a stepped upper wall complementary to the stepped lower wall of the upstream intake silencer, and stacked in a compact, vertical arrangement to improve the noise reducing effect of the upstream and downstream intake silencers and to form the outboard motor in a reduced vertical dimension.

Another object of the present invention is to provide an outboard motor provided with an internal combustion engine, capable of reducing noise generated by an engine cover vibrated by intake pulsation transmitted through an intake system disposed in an engine compartment formed by the engine cover to the air-intake space, reducing intake noise, improving effect on preventing water from mixing into intake air and improving the output performance of the internal combustion engine.

To attain the above objects, the present invention provides an outboard motor having an internal combustion engine with a combustion chamber, said outboard motor comprising: an upstream intake silencer receiving intake air for combustion; and a downstream intake silencer through which the intake air from the upstream intake silencer flows into the combustion chamber;

wherein the upstream intake silencer and the downstream intake silencer are disposed such that the upstream intake silencer is superposed above the downstream intake silencer, the upstream intake silencer has an upstream inlet passage, an upstream expansion chamber and an upstream outlet passage, the downstream intake silencer has a downstream inlet passage connected to the upstream outlet passage, a downstream expansion chamber and a downstream outlet passage, the upstream expansion chamber has a lower wall of a stepped shape including a raised part overlapping the downstream intake silencer in a plane and a lowered part without overlapping with the downstream intake silencer in a plane and at a level lower than that of the raised part, and the upstream outlet passage of the upstream intake silencer is formed in the raised part (53a) of the lower wall.

In the outboard motor of the present invention, the lowered part of the stepped lower wall of the upstream intake silencer does not overlap the downstream intake silencer and hence the lowered part can be disposed at a lowered level. Therefore, the intake noise reducing effect of the upstream intake silencer can be enhanced by forming the upstream expansion chamber in an increased volume.

Further, the raised part of the lower wall of the upstream expansion chamber, provided with the outlet passage connected to the inlet passage of the downstream intake silencer is disposed immediately above the downstream intake silencer, and hence the downstream intake silencer can be disposed in a space underlying the raised part of the lower wall of the upstream expansion chamber. Therefore, the outlet passage and the inlet passage can be connected and the upstream and downstream intake silencers can be disposed vertically close to each other by utilizing the raised part overlapping the downstream intake silencer. Thus, the upper and downstream intake silencers can be disposed in a compact vertical arrangement and hence the outboard motor can be formed in reduced vertical dimension.

Preferably, the downstream expansion chamber has a stepped upper wall including a raised part (67a) and a lowered part underlying the lower wall of the upstream expansion chamber in a plane and extending at a level lower than that of the raised part of the stepped upper wall, and the downstream inlet passage is formed in the lowered part of the upper wall.

According to this, the raised part of the stepped upper wall of the downstream intake silencer is at a level higher than that of the lowered part of the upper wall and hence the downstream expansion chamber can be formed in an increased volume, so that the downstream intake silencer is given a high intake noise reducing effect.

Further, since the lowered part of the upper wall having the downstream inlet passage connected to the upstream outlet passage of the upstream intake silencer underlies the upstream intake silencer, the upstream intake silencer is disposed in a space extending over the lowered part of the upper wall. Therefore, the lowered part can be connected to the upstream outlet passage and the upstream and downstream intake silencers can be vertically close to each other by utilizing the lowered part of the upper wall underlying the upstream intake silencer. Thus, the upstream and downstream intake silencers can be disposed in a vertically compact arrangement to form the outboard motor in reduced vertical dimension.

Preferably, the downstream inlet passage of the downstream intake silencer is formed in the lowered part of the upper wall.

Since the lower wall of the upstream intake silencer and the upper wall of the downstream intake silencer are formed in the stepped shapes complementary to each other, the lowered part of the lower wall of the upstream intake silencer does not overlap the downstream intake silencer in a plane, and the downstream raised part of the upper wall of the downstream intake silencer is at a level higher than that of the downstream lowered part, the upper and downstream expansion chambers can be formed in enlarged volumes, respectively, to enhance the respective intake noise reducing effects of the upstream and downstream intake silencers.

In another preferred mode of the present invention, the outboard motor further comprises an engine cover forming an engine compartment holding the internal combustion engine therein, the upstream intake silencer and the downstream intake silencer are disposed opposite to each other with respect to the engine cover, the upstream intake silencer is disposed in an air-intake space formed outside the engine compartment by the engine cover and cover means covering the engine cover from above, and the downstream intake silencer is disposed in the engine compartment.

The upstream intake silencer is disposed outside the engine compartment, and the downstream intake silencer is disposed inside the engine compartment, and the upstream intake silencer is disposed in the air-intake space defined by the engine cover and the cover means. Therefore, engine cover and the outboard motor can be formed in small sizes, respectively. The small engine cover resistant to vibration resulting from the intake pulsation enhances the effects of the upstream and downstream intake silencers on the attenuation of intake pulsation.

Preferably, the outboard motor of the present invention further comprises: an engine cover forming an engine compartment for holding the internal combustion engine having the combustion chamber therein, an intake system disposed in the engine compartment to carry intake air for combustion from the downstream intake silencer to the combustion chamber; and cover means covering the engine cover from above; wherein the upstream intake silencer is disposed outside the engine compartment and is spaced apart from the engine cover such that an air-intake space having an air-intake opening is formed between the upstream intake silencer and the engine cover, the upstream intake silencer has an upstream entrance duct opening into the air-intake space and forming the upstream inlet passage through which intake air taken in through the air-intake opening flows into the air-intake space, walls defining the upstream expansion chamber, and an upstream exit duct forming the upstream outlet passage through which intake air flows into the intake system, the upstream inlet passage has an upstream end opening into the air-intake space, and the air-intake opening is at a level lower than that of the upstream end of the upstream inlet passage and extends on right, left and rear sides of the upstream intake silencer.

Intake pulsation generated in the intake system disposed in the engine compartment is attenuated by the upstream intake silencer disposed outside the engine compartment, and the upstream intake silencer is spaced from the engine cover by the air-intake space. Therefore, transmission of intake pulsation transmitted from the intake system to the air-intake space is suppressed and noise resulting from the engine cover forming the air-intake space can be reduced.

The air-intake opening extends on the right, left and rear sides of the upstream intake silencer in a plane. Therefore, the air-intake opening can be formed in a small width while the air-intake opening ensures taking external air in at a necessary intake rate, and the effect of the air-intake opening on suppressing the entrance of water and foreign matters into the air-intake space can be ensured.

The air-intake opening is at a level lower than that of the upstream end of the upstream inlet passage, and the upstream entrance duct is separated from the engine cover and does not extend upward from the engine cover. Therefore, restrictions placed by the upstream entrance duct on the shape of the walls of the engine cover forming the air-intake space are reduced and the degree of freedom of designing the shapes of the walls of the engine cover is multiplied.

The upstream outlet passage may have a downstream end positioned on the rear side of the upstream end.

Since the upstream end of the air-intake opening is on the front side of the downstream end of the upstream outlet passage, it is difficult for water that has flowed through a rear part of the air-intake opening into the air-intake space to flow through the upstream end of the upstream inlet passage and the flow of water into the upstream intake silencer can be thus prevented.

In a preferred mode of the present invention, the lower wall of the upstream expansion chamber and the engine cover are on vertically opposite sides, respectively, of the air-intake space, and the upstream entrance duct does not project downward from the lower wall but projects upward from the lower wall into the upstream expansion chamber.

Since the upstream entrance duct extends upward into the upstream expansion chamber, water is restrained from flowing through the air-intake opening into the upstream expansion chamber. Thus, water is restrained from flowing into the upstream intake silencer. Since the upstream entrance duct extends upward into the upstream expansion chamber, the upstream intake silencer can be disposed vertically close to the engine cover and the outboard motor can be formed in a small vertical dimension.

Since the upstream entrance duct does not extend downward from the lower wall, a part of the lower wall around the inlet passage can be extended near the engine cover and the upstream expansion chamber can be formed in an increased volume without increasing the height of the upstream intake silencer from the engine cover. Thus, the outboard motor can be formed in reduced vertical dimension while the intake noise reducing effect can be enhanced by forming the upstream expansion chamber in an increased volume.

In a preferred form of the present invention, the engine cover has left and right side walls facing the air-intake opening, the air-intake space is defined by the cover means and the side walls and has rising parts rising upward from the air-intake opening, the rising parts lie between a right side part of the air-intake opening and the inlet passage and between a left side part of the air-intake opening and the inlet passage, respectively, with respect to lateral directions, and the rising parts connect to an upper part of the air-intake space into which the inlet passage opens.

Water that has flowed through the right and left side parts of the air-intake opening into the air-intake space impinges on and adheres to the side walls, so that the amount of water that flows upward in the rising parts is reduced and water is restrained from flowing into the upstream intake silencer.

Preferably, the air-intake opening extends longitudinally on the right and left sides of the upstream end of the upstream inlet passage and the downstream end of the upstream outlet passage beyond the opposite longitudinal ends of a range in which the upstream end of the upstream inlet passage and the downstream end of the upstream outlet passage are arranged.

Since the air-intake opening extends longitudinally on the right and left sides of the upstream and downstream ends beyond the longitudinally opposite ends of the range in which the upstream and downstream ends are arranged, the air-intake opening can be formed in an increased length. Therefore, the air-intake opening can be formed in a small width to prevent the entrance of water and foreign matters into the air-intake space.

Preferably, the upstream end of the upstream inlet passage and the downstream end of the outlet passage are longitudinally spaced apart from each other and are disposed on the front and rear sides, respectively, of the center axis of the output shaft of the internal combustion engine.

When the upstream end and the downstream end of the outlet passage are thus arranged, the air-intake opening can be formed in an increased longitudinal length. Therefore, the air-intake opening can be formed in a small width to prevent the entrance of water and foreign matters into the air-intake space.

In a preferred form of the present invention, the outboard motor further includes an engine cover forming an engine compartment for holding the internal combustion engine therein, an intake system disposed in the engine compartment to carry intake air from the downstream intake silencer to the combustion chambers, and cover means covering the engine cover from above, wherein the upstream intake silencer is disposed outside the engine compartment such that an air-intake space having an air-intake opening is formed between the upstream intake silencer and the engine cover, the intake system includes a throttle device into which intake air flows from the downstream intake silencer, the upstream intake silencer has the upstream inlet passage opening into the air-intake space to receive intake air from the air-intake space, and the outlet passage through which intake air flows from the upstream intake silencer into the downstream intake silencer, the downstream intake silencer has the downstream inlet passage connecting to the upstream outlet passage of the upstream intake silencer, and the downstream outlet passage through which intake air flows from the downstream intake silencer into a throttle passage formed in the throttle device, the upstream inlet passage of the upstream intake silencer is on a front side of the upstream outlet passage, and the downstream outlet passage of the downstream intake silencer is disposed on an opposite side of the upstream inlet passage of the upstream intake silencer with respect to the upstream outlet passage of the upstream intake silencer and the downstream inlet passage of the downstream intake silencer.

Thus, the intake system disposed in the engine compartment includes the downstream intake silencer, and the upstream intake silencer is disposed outside the engine compartment. Therefore, intake pulsation generated in the intake system is attenuated by the upstream intake silencer and hence intake noise is reduced.

In the upstream intake silencer, the upstream inlet passage opening into the air-intake space formed outside the engine compartment is formed on the front side of the upstream outlet passage. Therefore, the longitudinal distance between the rear part of the air-intake opening near the rear end of the air-intake space and the upstream inlet passage is increased. Thus, water that has flowed into the air-intake space can be restrained from flowing into the upstream intake silencer. Consequently, the flow of water through the upstream inlet passage into the upstream intake silencer can be effectively prevented.

The downstream outlet passage is longitudinally on the opposite side of the upstream inlet passage with respect to the upstream outlet passage and the downstream inlet passage. Therefore, intake air flows smoothly in the longitudinal direction through the upstream inlet passage, the upstream outlet passage and the downstream inlet passage into the downstream outlet passage and hence intake resistance is low. Consequently, the internal combustion engine operates at high volumetric efficiency and can achieve high output performance.

In a preferred form of the present invention, the upstream outlet passage of the upstream inlet passage, the downstream inlet passage of the downstream intake silencer and the downstream outlet passage of the downstream intake silencer are so arranged as to intersect a straight line intersecting the upstream inlet passage and the throttle passage in a plane.

Since the upstream inlet passage, the upstream outlet passage, the downstream inlet passage, the downstream outlet passage and the throttle passage are thus arranged on a straight line in a plane, the flow of intake air from the upstream inlet passage, the upstream outlet passage and the downstream inlet passage into the downstream outlet passage, i.e., the flow of intake air through the upstream and downstream intake silencers does not meander laterally. Consequently, resistance to the flow of intake air is low and the internal combustion engine operates at high volumetric efficiency.

Preferably, the throttle passage extends longitudinally or along the straight line in a plane.

When the throttle passage is thus extended, resistance to intake air exerted by the passages in the upstream and downstream intake silencers and the throttle device is low and hence the internal combustion engine operates at high volumetric efficiency.

DESCRIPTION OF THE PREFERRED EMBODIMENTS

An outboard motor S in a preferred embodiment of the present invention will be described with reference to FIGS. 1 to 16.

Figure 1:
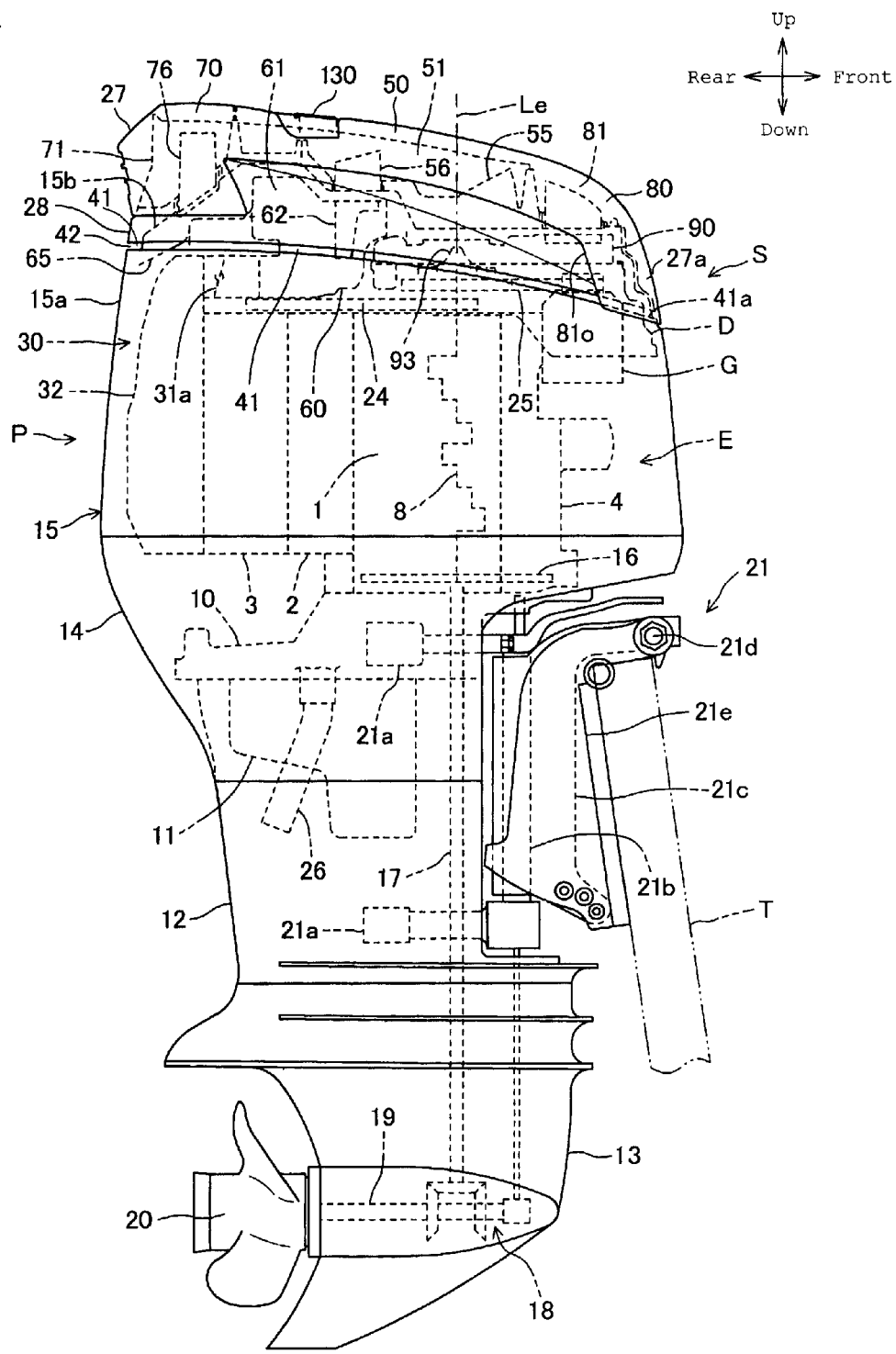
FIG. 1 is a side elevation of an outboard motor in a preferred embodiment of the present invention taken from the right side of the outboard motor.

Referring to FIG. 1, the outboard motor S as a ship-propulsion machine includes a power unit P, a propeller 20, namely, a thrust-producing member, driven by the power unit P, and a holding device 21 for holding the power unit P on a transom of a hull T of a boat. The power unit P includes an internal combustion engine E, a transmission for transmitting the output power of the internal combustion engine E to the propeller 20, covers including an engine cover 15 forming an engine compartment R (FIG. 2) for holding the internal combustion engine E therein, an upstream intake silencer 50 through which intake air for the engine E is taken in, and a ventilation system for ventilating the engine compartment R.

Figure 2:
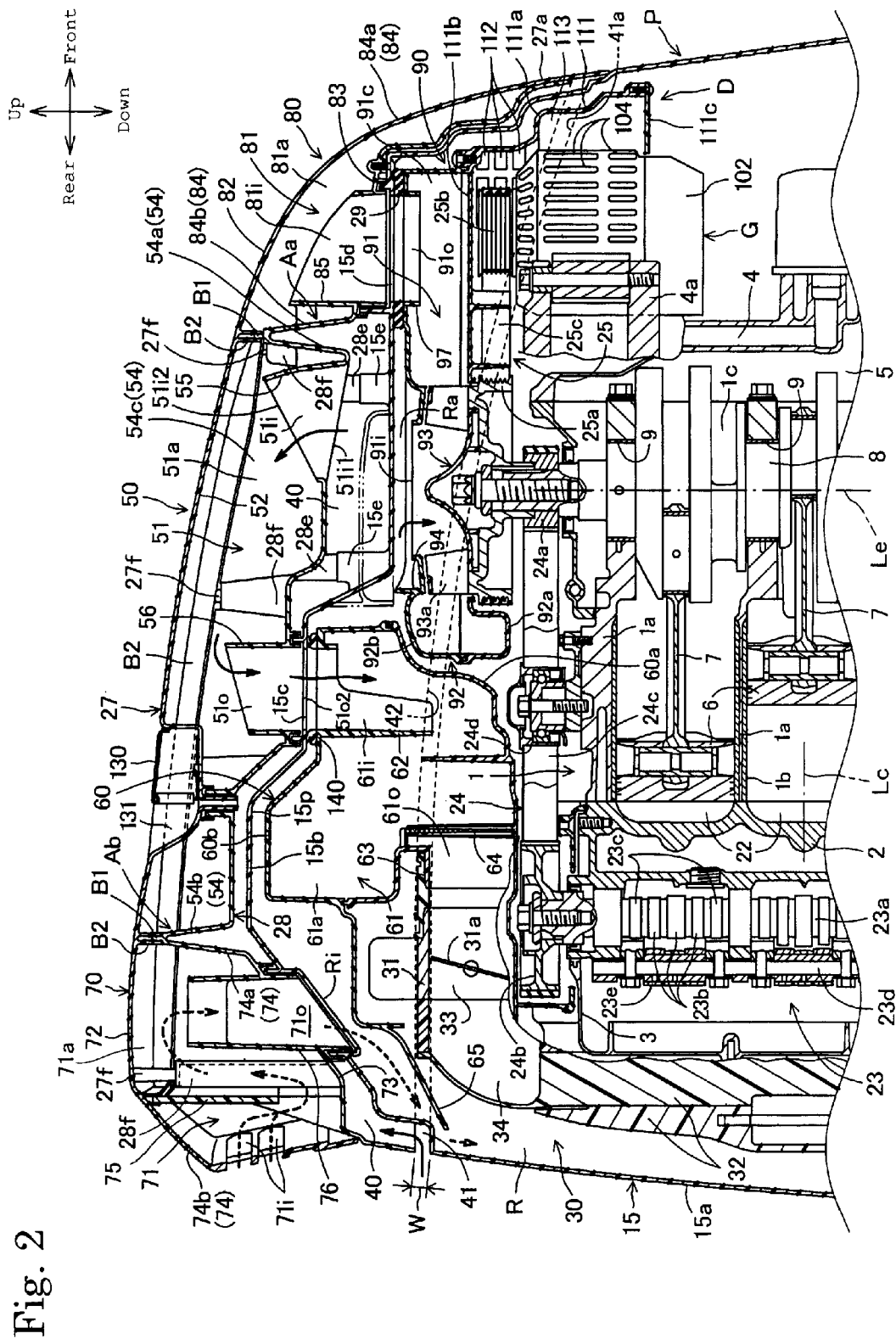
FIG. 2 is a sectional view taken on the line IIa-IIa in FIG. 3 and partly on the line IIb parallel to the axes of cylinders.

Referring to FIG. 2, the internal combustion engine is a vertical V-type four-stroke water-cooled six-cylinder internal combustion engine provided with cylinders 1a and a crankshaft 8 having a vertical center axis Le. The internal combustion engine E has an engine body including a V-type cylinder block 1 having two banks provided with six cylinders 1a opening rearward and pistons 6 axially slidably fitted in the cylinders 1a, respectively, two cylinder heads 2 joined to the rear ends of the two banks, respectively, of the cylinder block 1, valve covers 3 joined to the rear ends, respectively, of the cylinder head 2, and a crankcase 4 joined to the front end of the cylinder block 1 to form a crank chamber 5.

The cylinder heads 2 and the valve covers 3 are rear members of the engine body. The crankcase 4 is a front member of the engine body on the front side of the center axis Le of the crankshaft 8.

The piston 6 fitted in the cylinder bore 1b of each cylinder 1a is connected to the crankshaft 8 by a connecting rod 7. The crankshaft 8 is disposed in the crank chamber 5 defined by the rear part of the cylinder block 1 and the crankcase 4. The crankshaft 8 is supported for rotation on the cylinder block 1 by main bearings 9.

In the description and claims, directions designated by vertical directions, longitudinal directions and lateral directions correspond to vertical directions, longitudinal directions and lateral directions with respect to the hull T. As shown in FIG. 1, a direction parallel to the center axis Le of the crankshaft 8 is the vertical direction, and the longitudinal directions and the lateral directions are in a horizontal plane perpendicular to the center axis Le. An upward and a downward direction are parallel to the vertical center axis Le, forward and rearward directions are parallel to one of the longitudinal directions and the other longitudinal direction, respectively. A rightward and a leftward direction are one of the lateral directions and the other lateral direction, respectively. Viewing in a plane means viewing from a vertical direction or a direction parallel to the center axis Le. A circumferential direction is parallel to a circumference about the center axis Le unless otherwise specified.

The engine body is joined to the upper end of a mount case 10. An oil pan 11 and an extension case 12 are joined to the lower end of the mount case 10. The oil pan 11 is surrounded by the extension case 12. A gear case 13 is joined to the lower end of the extension case 12. A lower cover 14 is attached to the extension case 12 so as to cover a lower part of the internal combustion engine E, the mount case 10 and an upper part of the extension case 12. An engine cover 15 joined to the upper end of the lower cover 14 covers a greater part, including an upper part, of the internal combustion engine E. The engine cover 15 and the lower cover 14 form an engine compartment R. The internal combustion engine E is disposed in the engine compartment R. The engine cover 15 includes a side wall 15a extending horizontally around the center axis Le so as to surround the internal combustion engine E and a top wall 15b covering the engine E from above. An alternator G, namely, an accessory of the internal combustion engine E, is installed in the engine compartment E.

A flywheel 16 and a driveshaft 17 are connected to the lower end of the crankshaft 8, namely, the output shaft of the engine E. The driveshaft 17 is driven for rotation by the crankshaft 8. The driveshaft 17 extends vertically through the mount case 10 and the extension case 12 into the gear case 13. The driveshaft 17 is interlocked with a propeller shaft 19 by a forward-rearward change gear 18. A propeller 20 is mounted on the propeller shaft 19. The output power of the internal combustion engine E is transmitted from the crankshaft 8 through the driveshaft 17, the forward-rearward change gear 19 and the propeller shaft 19 to the propeller 20 to rotate the propeller 20. In this embodiment, the center axis of the driveshaft 17 coincides with the center axis Le of the crankshaft 8. The center axis of the driveshaft 17 may be parallel to the center axis Le of the crankshaft 8.

The engine cover 15, the lower cover 14, the mount case 10, the extension case 12 and the gear case 13 are covering members. The drive shaft 17, the forward-rearward change gear 18 and the propeller shaft 19 are the components of the transmission for transmitting the output power of the engine E to the propeller 20.

Referring to FIG. 1, the holding device 21 includes a swivel case 21c rotatably supporting a swivel shaft 21b fixedly held by mounting rubber cushions 21a on the mount case 10 and the extension case 12, a tilt shaft 21d supporting the swivel case 21c so as to be turnable thereon, and a transom clamp 21e holding the tilt shaft 21d and fixed to the transom of the hull T. The power unit P including the propeller 20 and supported on the hull T by the mounting device 21 is turnable on the tilt shaft 21d in a vertical plane and can turn on the swivel shaft 21b in a horizontal plane.

Referring to FIG. 2, each cylinder head 2 forms combustion chambers 22 facing the pistons 6 fitted in the cylinders 1a, respectively, and is provided with intake and exhaust ports opening into the combustion chamber 22, and spark plugs provided with electrodes exposed to the combustion chambers 22. The combustion chambers 22 are axially opposite to the pistons 6, respectively. Each cylinder head 2 and the pistons 6 fitted in the cylinder bores 1b define the combustion chambers 22, respectively. Intake and exhaust valves placed in each cylinder head 2 are driven to open and close the intake and the exhaust ports in synchronism with the rotation of the crankshaft 8 by an overhead-camshaft valve train 23 installed in a camshaft chamber formed by each cylinder head 2 and a valve cover 3.

The camshaft valve train 23 includes a camshaft 23a provided with intake cams 23b and exhaust cams 23c, a pair of rocker arm shafts 23d, intake rocker arms 23e supported on one of the rocker arm shafts 23d, exhaust rocker arms, not shown, supported on the other rocker arm shaft 23d. The camshaft 23a is rotationally driven through a valve train driving mechanism 24 by the crankshaft 8. The intake rocker arms 23e and the exhaust rocker arms rock on the rocker arm shafts 23d, respectively. The intake cams 23b and the exhaust cams 23c drive the intake valves and the exhaust valves through the intake rocker arms 23e and the exhaust rocker arms to open and close the intake valves and the exhaust valves, respectively.

Figure 3:
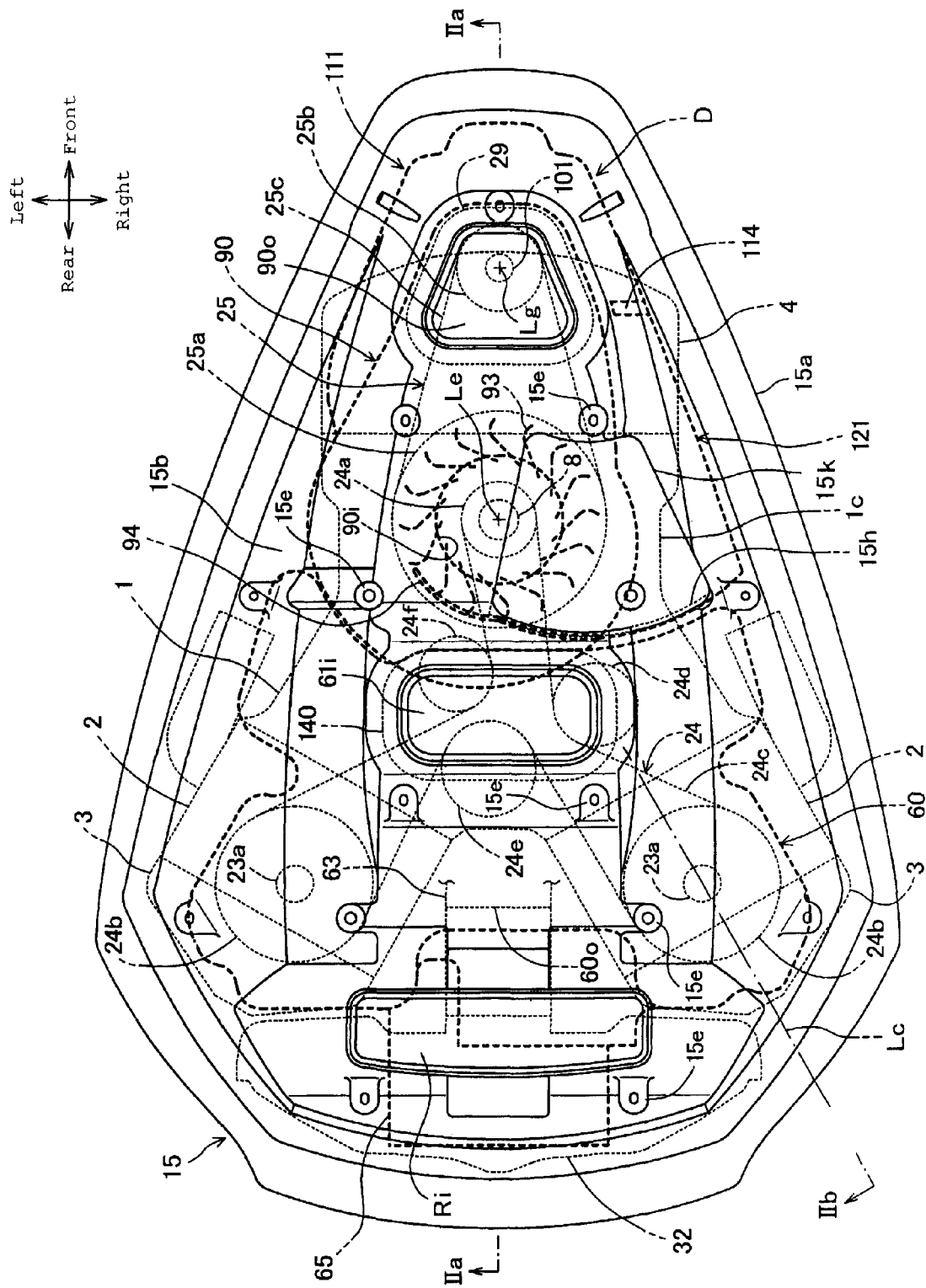
FIG. 3 is a plan view of the outboard motor shown in FIG. 1, in which a top cover and an intermediate cover are removed.

Referring to FIGS. 2 and 3, a valve drive pulley 24a and an accessory drive pulley 25a are put in that order on an upper end part of the crankshaft 8. The camshaft valve train driving mechanism 24 includes the drive pulley 24a, a camshaft pulley 24b mounted on the camshaft 23a, and a belt 24c passed between the drive pulley 24a and the camshaft pulley 24b. An accessory driving mechanism 25 includes the drive pulley 25a, a driven pulley 25b mounted on a rotor shaft 101 of the alternator G, and a belt 25c passed between the drive pulley 25a and the driven pulley 25b. The camshaft valve train driving mechanism 24 and the accessory driving mechanism 25 are covered from above with a belt cover structure connected to the upper end of the engine body in the engine compartment R. The belt cover structure includes a downstream intake silencer 60 and an exit ventilation structure 90. The downstream intake silencer 60 is an intake passage forming structure disposed immediately above the cylinder heads 2 and the top cylinders 1a and covering a major part of the camshaft pulleys 24b and the belt 24c. The exit ventilation structure 90 is disposed immediately above the crankcase 5 and covers the driven pulley 25b, the belt 24c partly and the belt 25c entirely. The belt 24c is wound around a tension pulley 24d and two idle pulleys 24e and 24f.

The downstream intake silencer 60 and the exit ventilation structure 90, which are disposed in the engine compartment R, are separate structures which are separate from the engine cover 15. The downstream intake silencer 60 and the exit ventilation structure 90 are arranged longitudinally so as to form the belt cover structure divided into front and rear parts and covering the camshaft valve train driving mechanism 24 and the accessory driving mechanism 25.

The internal combustion engine E is provided with an intake system 30 (FIG. 2) disposed in the engine compartment R and forming an intake passage. Intake air for combustion flowing through the intake passage is mixed with fuel ejected by a fuel injection valve to produce an air-fuel mixture. The air-fuel mixture burns to produce combustion gases when ignited in the combustion chambers 22 by the spark plugs. The pistons 6 are driven by the combustion gases to drive the crankshaft 8 for rotation through the connecting rods 7. Referring again to FIG. 1, the combustion gases that have worked in the combustion chambers to drive the crankshaft 8 are discharged from the outboard motor S as an exhaust gas from the combustion chambers 22 through the exhaust ports, an exhaust manifold joined to the cylinder heads 2, an exhaust pipe 26, and an exhaust passage, not shown, formed in the extension case 12, the gear case 13 and the boss of the propeller 20.

Referring to FIGS. 1 to 3, the power unit P has an air-intake structure disposed outside the engine compartment R and immediately above the top wall 15b of the engine cover 15. The air-intake structure includes an upstream intake silencer 50 through which air (intake air) for combustion taken in from outside the outboard motor S flows into the intake system 30, and a ventilation passage forming structure for taking external air for ventilation into the engine compartment R and for discharging the air for ventilation from within the engine compartment R or the outboard motor S.

Figure 4:
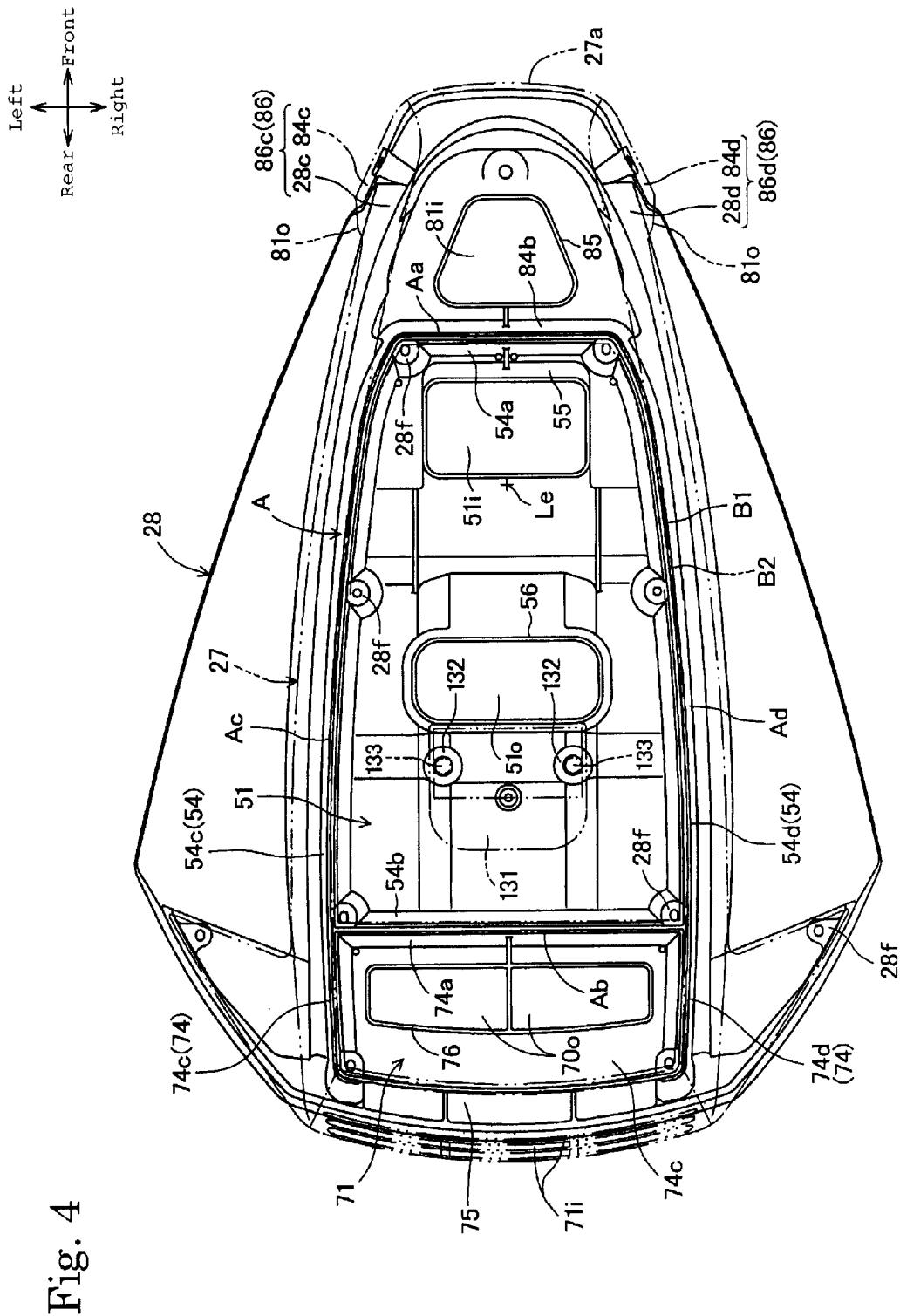
FIG. 4 is a top plan view of the intermediate cover of the outboard motor shown in FIG. 1, in which the top cover is indicated by two-dot chain lines.
Figure 5:
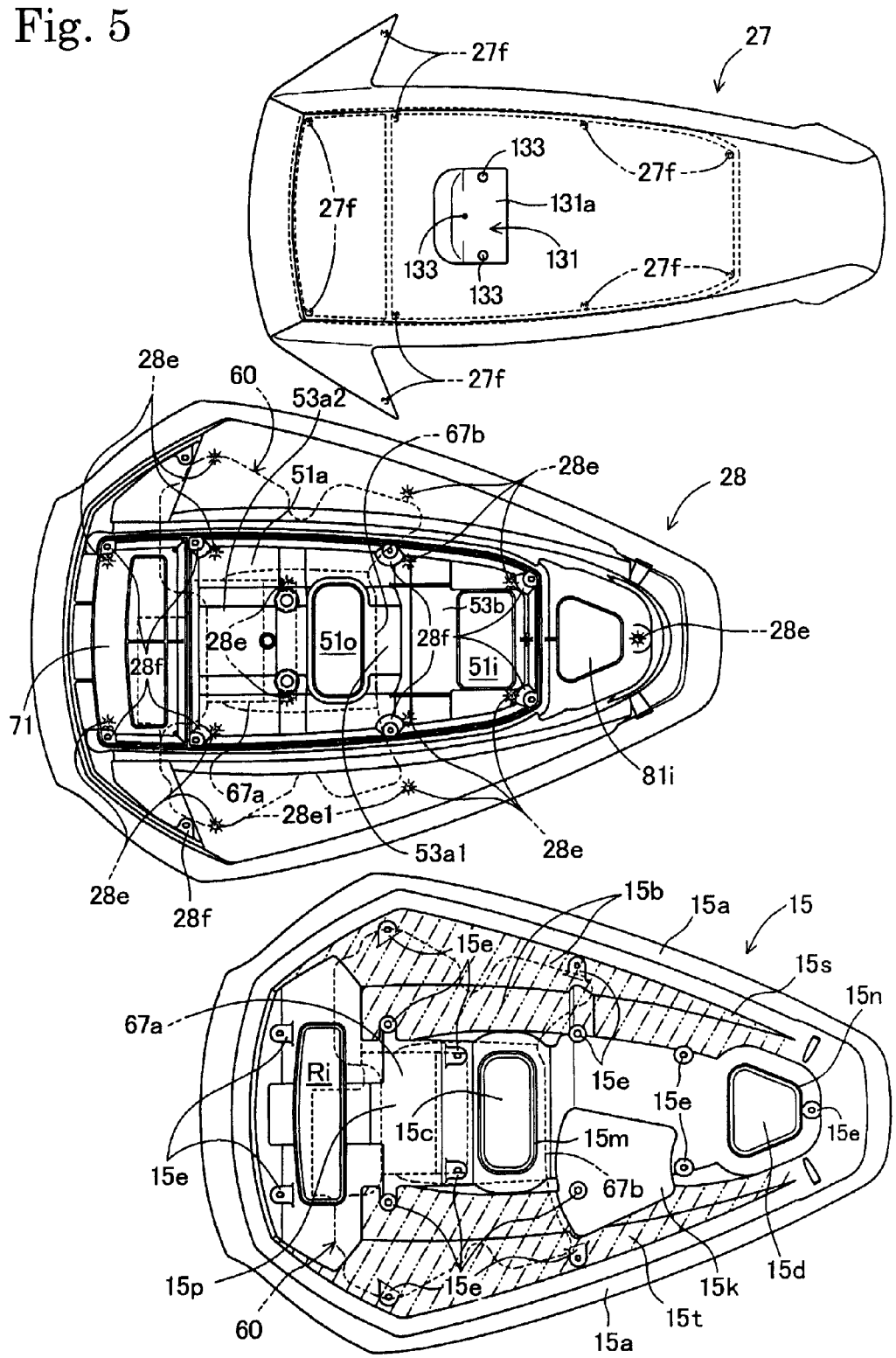
FIG. 5 is a plan view of an engine cover, the intermediate cover and the top cover included in the outboard motor shown in FIG. 1.
Figure 6:
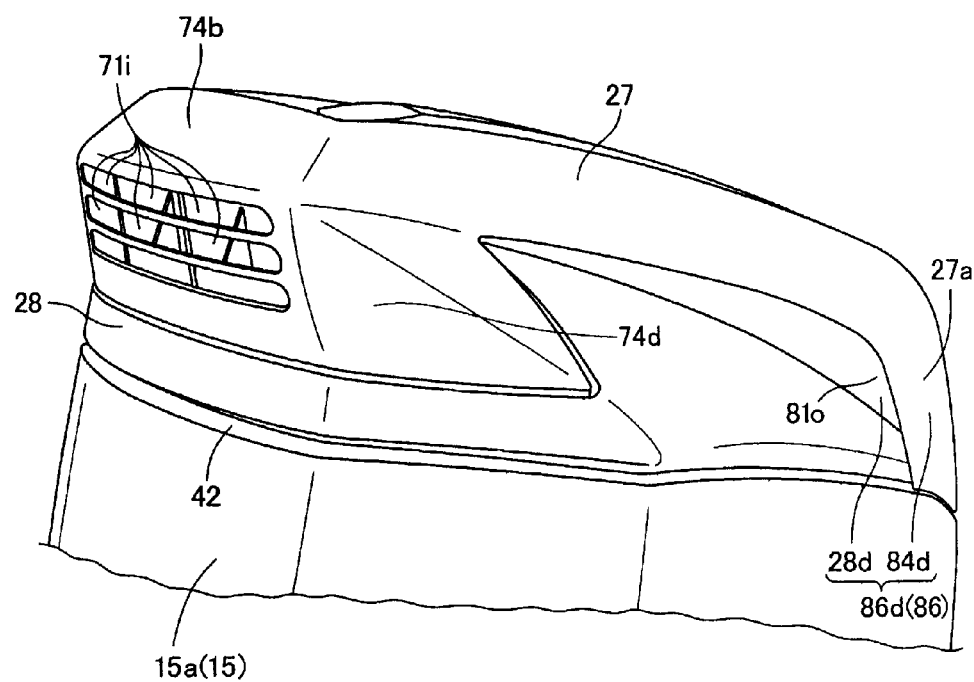
FIG. 6 is a perspective view of an essential part of the outboard motor shown in FIG. 1.

Referring to FIGS. 4 to 6, the air-intake structure includes an outer cover detachably attached to the top wall 15b of the engine cover 15. The outer cover forms the external shape of the outboard motor S together with the engine cover 1. The outer cover includes a top cover 27, namely, an upper-end member of the outboard motor S, and an intermediate cover 28 disposed between the top cover 27 and the top wall 15b.

The engine cover 15, the top cover 27 and the intermediate cover 28 are unitary, plastic members formed by molding a synthetic resin.

The intermediate cover 28, namely, an intermediate member, is disposed in a space between the engine cover 15 and the top cover 27 and is spaced from the top wall 15b of the engine cover 15 and the top cover 27. The top cover 27 is attached to the intermediate cover 28 which is in turn attached to the top wall 15b. The engine cover 15 and the top cover 27 are thus fastened to the intermediate cover 28. The whole or a major part of the top cover 15b is covered with the intermediate cover 28 from above. A major part of the intermediate cover 28 is covered with the top cover 27 from above. A substantially whole or a major part of the intermediate cover 28 with respect to the longitudinal direction is covered with the top cover 27.

As indicated in FIG. 2, the upstream intake silencer 50, and the ventilation system including an entrance ventilation structure 70 and an exit ventilation structure 80 are formed of parts of the top cover 27 and the intermediate cover 28. The top cover 27 and the intermediate cover 28 form therebetween an upstream intake passage 51 through which intake air flows into the intake passage of the intake system 30, an inlet ventilation passage 71 (see also FIG. 5) through which external air for ventilation flows into the engine compartment R, an outlet ventilation space 81 through which air discharged from the engine compartment R flows to the outside of the top cover 27 and the intermediate cover 28, namely, into the atmosphere.

A space extending between the intermediate cover 28 and the top wall 15b of the engine cover 15 is an air-intake space 40 through which external air taken in as intake air flows into the upstream intake passage 51.

Thus, under and over the intermediate cover 28 are formed a lower space including the air-intake space 40, and a lower space including the inlet ventilation passage 71, the upstream intake passage 51 and the outlet space 81, respectively. Parts of the top wall 15b and the intermediate cove 28 touch each other to prevent leakage of air between the air-intake passage 40 and the outer outlet ventilation space 81.

Figure 7:
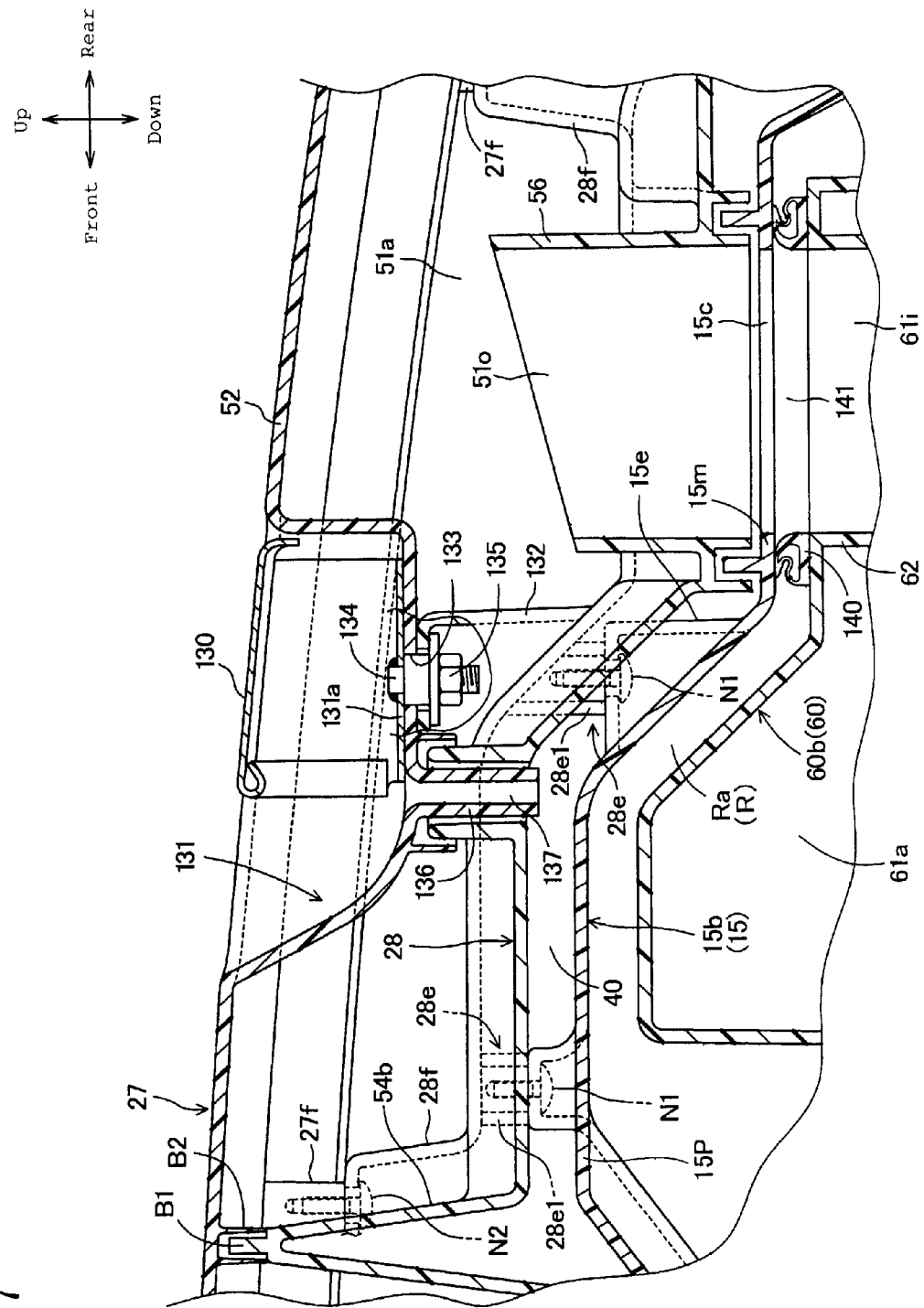
FIG. 7 is an enlarged sectional view of FIG. 2, showing a part around a grip.

Referring to FIG. 7 which is an enlarged partial view of FIG. 2, there are provided cylindrical or substantially cylindrical joining protrusions 15e of the top wall 15b of the engine cover 15, and cylindrical or substantially cylindrical joining protrusions 28e of the intermediate cover 28 respectively corresponding to the joining protrusions 15e. These joining protrusions 15e and 28e are fastened together with screws N1, namely, fastening members. The joined joining protrusions 15e and 28e determine the vertical distance between the top wall 15b and the intermediate cover 28.

As shown in FIG. 2, the air-intake space 40 has a peripheral opening 41. The peripheral opening 41 extends along the circumference of the engine cover 15 and the lower edge of the intermediate cover 28. The width W of the peripheral opening 41 (FIGS. 2 and 12) is equal to the distance between the boundary of a side wall 15a and the top wall 15b of the engine cover 15, and the lower edge of the intermediate cover 28. A front part 41a (FIG. 1) of the peripheral opening 41 is closed by a front end part 27a of the top cover 27. The peripheral opening 41 excluding the front part 41a serves as an air-intake opening 42. External air for combustion flows through the air-intake opening 42 into the air-intake space 40. When a main part 81a of the outer outlet ventilation space 81 is divided into a front space and a rear space, the front end part 27a of the top cover 27 on the front side of the upstream intake silencer 50 is disposed at substantially the same position as the front space. Water is restrained from flowing through the air-intake opening 42 by the front end part 27a of the top cover 27.

As shown in FIG. 7, there are provided a cylindrical or substantially cylindrical joining protrusions 27f of the top cover 27, and cylindrical or substantially cylindrical joining protrusions 28f of the intermediate cover 28 respectively corresponding to the joining protrusions 28f. These joining protrusions 27f and 28f are fastened together with screws N2, namely, fastening members. The joined protrusions 27f and 28f determines the distance between the vertical distance between the top cover 27 and the intermediate cover 28.

The top cover 27 and the intermediate cover 28 united together are connected to the engine cover 15, and then the engine cover 15 is joined to the lower cover 14. The engine cover 15 is thus connected to the top cover 27 through the intermediate cover 28.

First joints are each formed by inserting the screw N1 through the joining protrusion 15e and screwing the screw N1 into the joining protrusion 28e. The first joints are distributed in the air-intake space 40 defined by the engine cover 15 and the intermediate cover 28. The joining protrusions 15e protruding upward from the top wall 15b are formed integrally with the top wall 15b so as to correspond to the joining protrusions 28e, respectively. The joining protrusions 28e protruding downward from the intermediate cover 28 is formed integrally with the intermediate cover 28.

The upstream intake silencer 50 and the entrance ventilation structure 70 are spaced apart from the top wall 15b of the engine cover 15 by the first joints to form the air-intake space 40 between the engine cover 15 and the upstream intake silencer 50 and between the engine cover 15 and the entrance ventilation structure 70.

Second joints are each formed by inserting the screw N2 through the joining protrusion 28f and screwing the screw N2 into the joining protrusion 27f. The second joints are distributed in the inlet ventilation passage 71 and in an upstream expansion chamber 51a. The joining protrusions 28f are formed integrally with the intermediate cover 28 so as to protrude upward from the intermediate cover 28 and so as to correspond to the joining protrusions 27f, respectively. The joining protrusions 27f are formed integrally with the top cover 27 so as to protrude downward.

Each joining protrusion 28e is provided with ribs 28e1 extending radially outward from the joining protrusion 28e to rigidify the joining protrusion 28e. As shown in FIGS. 4 and 5, the joining protrusions 28f of a vertical length greater than those of the joining protrusions 15e, 28e and 27f are formed integrally with a side wall 54 of the upstream intake silencer 50. The longer joining protrusions 28f are reinforced and rigidified by the side wall 54.

Figure 8:
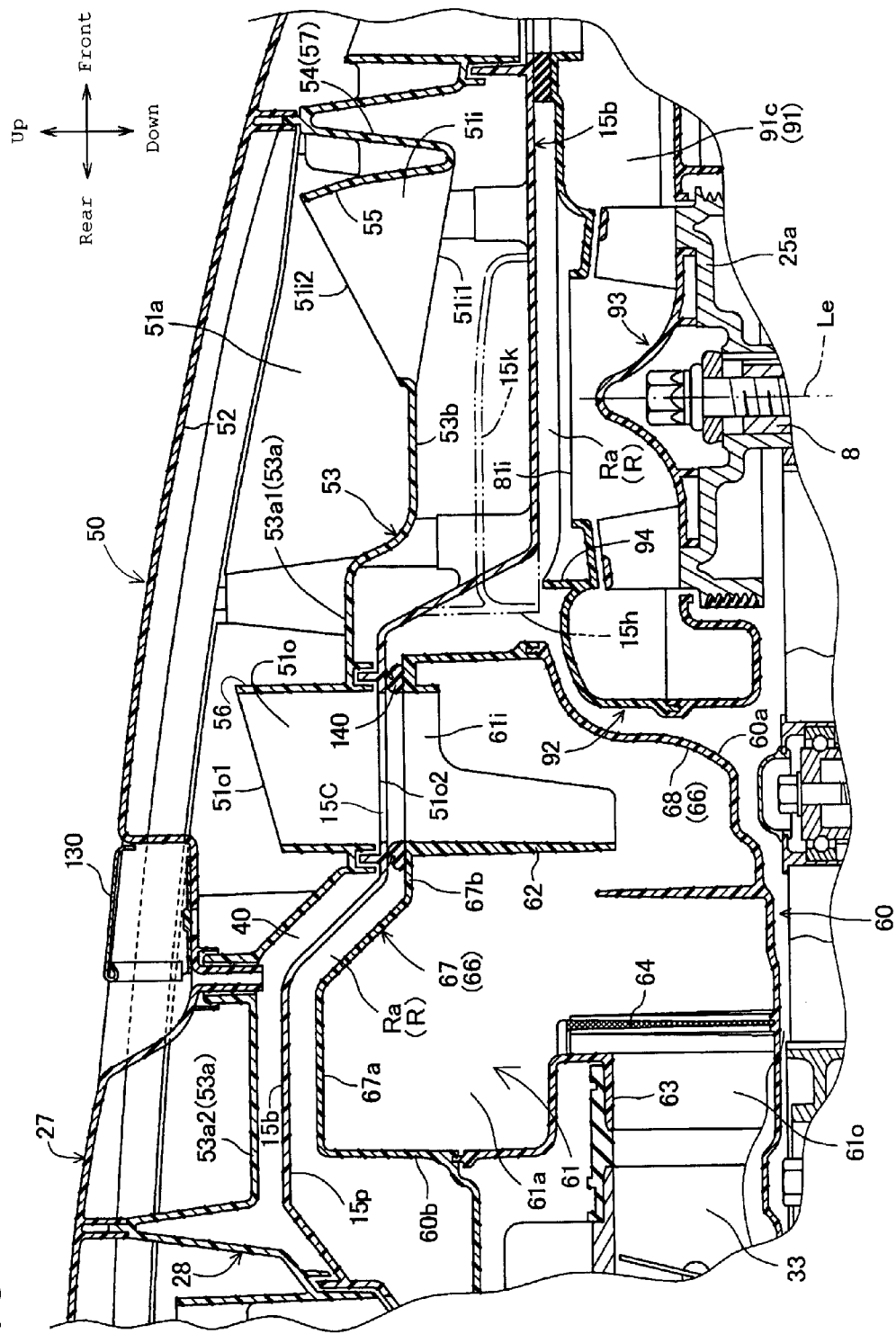
FIG. 8 is an enlarged sectional view of FIG. 2, showing a part around intake silencers.

Referring to FIGS. 7 and 8, the upstream intake silencer 50 disposed outside the engine compartment R and forming the upstream intake passage 51 has an upper wall 52, namely, a part of the top cover 27, a lower wall 53, namely, a part of the intermediate cover 28, a circumferential side wall 54, namely, a part of the intermediate cover 28, extending between the upper wall 52 and the lower wall 53, an upstream entrance duct 55 formed by a part of the intermediate cover 28, and an upstream exit duct 56 formed by a part of the intermediate cover 28. As shown in FIG. 8, the lower wall 53 is vertically opposite to the top wall 15b of the engine cover 15 with the air-intake space 40 therebetween. As shown in FIG. 4, the circumferential side wall 54 of the upstream intake silencer 50 has a front part 54a, a rear part 54b, a left part 54c and a right part 54d. The upstream entrance duct 55 is separated upward from the top wall 15b of the engine cover 15.

As shown in FIG. 7, the upper wall 52 of the upstream intake silencer 50 is provided with a grip 130. The grip 130 is gripped to move the assembly of the top cover 27, the intermediate cover 28 and the engine cover 15 when the engine cover needs to be connected to or disconnected from the lower cover 14. The grip 130, namely, an individual member separate from the top cover 27, is placed in a recess 131 formed in the upper wall 52 of the upstream intake silencer 50, and is fastened to a pair of joining protrusions 132 formed integrally with the intermediate cover 28 by passing bolts 134 through openings 133 formed in a bottom wall 131a defining the bottom of the recess 131, and screwing nuts 135 on the bolts 134, respectively. A protrusion 136 formed integrally with the bottom wall 131a extends downward through the upstream expansion chamber 51a into the air-intake space 40. The protrusion 136 is provided with a drain hole 137 opening into the air-intake space 40 to drain water that has entered the recess 131.

Referring to FIG. 8, the lower wall 53 is a stepped wall having a raised part 53a overlapping the downstream intake silencer 60 in a plane, and a lowered part 53b separated from the downstream intake silencer 60 in a plane and at a level lower than that of the high part 53a. The raised part 53a behind the lowered part 53b has a first raised part 53a1 provided with the upstream exit duct 56 forming an upstream outlet passage 51o, and a second raised part 53a2 extending behind the first raised part 53a1 at a level higher than that of the first raised part 53a1.

Referring to FIGS. 2, 7 and 8, the upstream intake passage 51, through which intake air flows into the internal combustion engine E, has the upstream expansion chamber 51a, namely, an intake silencing chamber, defined by a structure 57 formed of the upper wall 52, the lower wall 53 and the side wall 54, an upstream inlet passage 51i defined by the upstream entrance duct 55 through which air flows from the air-intake space 40 into the upstream expansion chamber 51a, and the upstream outlet passage 51o defined by the upstream exit duct 56. Intake air taken in through the air-intake opening 42 flows through the upstream entrance duct 55 into the upstream expansion chamber 51a. Intake air flows from the upstream expansion chamber 51a through the upstream outlet passage 51o into a downstream inlet passage 61i. The sectional area of the upstream expansion chamber 51a into which intake air flows from the air-intake opening 40 is greater than those of the upstream inlet passage 51i and the upstream outlet passage 51o.

The upstream inlet passage 51i has an upstream end 51i1 opening toward the air-intake space 40, and a downstream end 51i2 opening into the upstream expansion chamber 51a. The upstream outlet passage 51o has an upstream end 51o1 opening into the upstream expansion chamber 51a, and a downstream end 51o2 opening into a downstream inlet passage 61i. The upstream outlet passage 51o opens into an opening 15c formed in the top wall 15b of the engine cover 15. An annular sealing member 140 is clamped between a part of the top wall 15b around the opening 15c and a downstream entrance duct 62 forming the downstream inlet passage 61i.

The upstream outlet passage 51o and the downstream inlet passage 61i are so aligned as to form a vertical, straight passage.

The upstream end 51i1 of the upstream inlet passage 51i opens into the air-intake space 40. The upstream inlet passage 51i and the upstream outlet passage 51o are longitudinally spaced apart from each other and are on the front and the rear side, respectively of the center axis Le. The downstream end 51o2 of the upstream outlet passage 51o is on the rear side of the upstream end 51i1 of the upstream inlet passage 51i.

Figure 10:
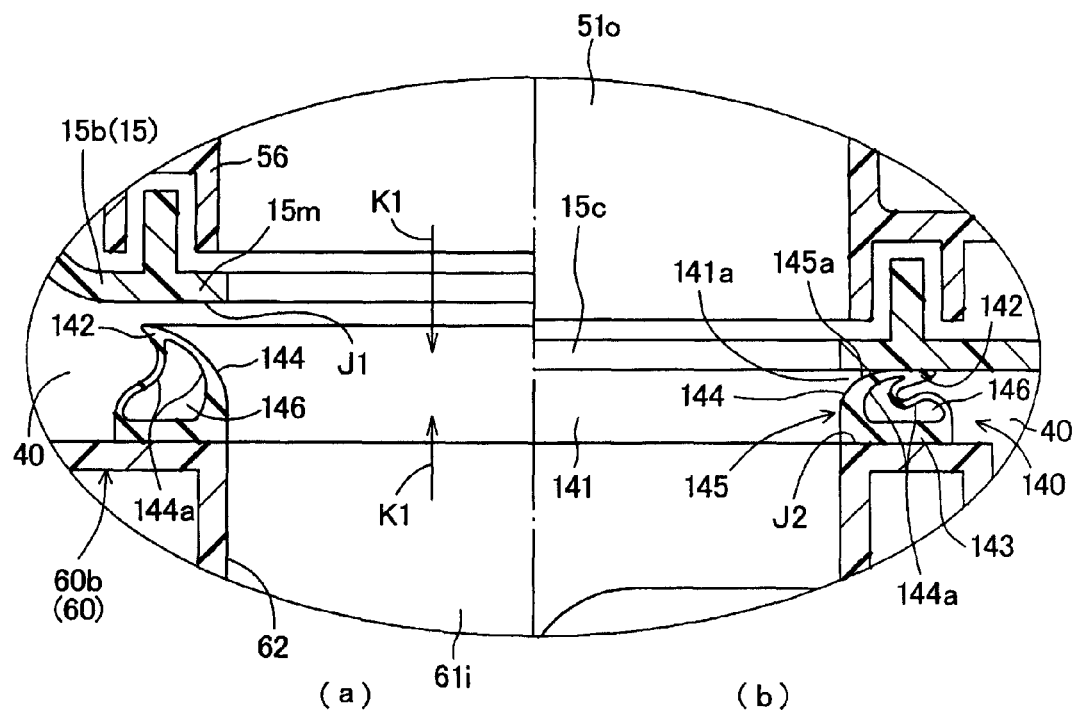
FIG. 10 is an enlarged view of an essential part around a downstream entrance duct shown in FIG. 2, in which (a) shows a disconnected state before a passage forming member and the downstream entrance duct are connected and (b) shows a connected state after the passage forming member and the downstream entrance duct have been connected.

Referring to FIGS. 2, 7 and 10, the sealing member 140 is clamped between a circumferential edge 15m of the top wall 15b of the engine cover defining the opening 15c, and the downstream entrance duct 62 formed integrally with an upper case 60b included in the downstream intake silencer 60. The sealing member 140 forms a connecting passage 141 connecting the opening 15c at the downstream end of the upstream outlet passage 51o and the downstream inlet passage 61i. When the engine cover 15 combined with the top cover 27 and the intermediate cover 28 is joined to the lower cover 14 (FIG. 1) so as to cover the internal combustion engine E mounted on the mount case 10 (FIG. 1) from above, the circumferential edge 15m and the downstream entrance duct 62 are joined with the sealing member 140 clamped between the circumferential edge 15m and the downstream entrance duct 62.

The circumferential edge 15m and the downstream entrance duct 62 have joining surfaces J1 and J2, respectively. The joining surfaces J1 and J2 are opposite to each other with respect to joining directions K1. The sealing member 140 is clamped tight between the joining surfaces J1 and J2 to seal gaps between the circumferential edge 15m and the downstream entrance duct 62. The joining surfaces J1 and J2 are flat surfaces substantially perpendicular to the joining directions K1 or the main flow of the intake air flowing from the upstream outlet passage 51o through the opening 15c and the connecting passage 141 into the downstream inlet passage 61i.

The sealing member 140 is made of an elastomer, namely, an elastic material having rubber-like elasticity. The sealing member 140 has a sealing lip 142 to be pressed closely against the joining surface J1 of the circumferential edge 15m, namely, a first passage forming member, a body 143, namely, a fixed sealing part, firmly fixed to the joining surface J2 of the downstream entrance duct 62 by fixing means, such as baking, a flexible circumferential side part 144 that is bent or curved elastically when the circumferential edge 15m is placed close to the downstream entrance duct 62 with a gap between the circumferential edge 15m and the downstream entrance duct 62 in a connected state shown in FIG. 10(b) and the lip 142 pressed against the joining surface J1 as shown FIG. 10(b) to join the engine cover 15 and the intermediate cover 28, and an inside surface 145 exposed to the connecting passage 141 and being subjected to the pressure of intake air.

The sealing member 140 is provided with a hollow 146 filled up with air of a pressure that permits the flexible circumferential side part 144 to be bent.

The flexible lip 142 that can come into contact with and separate from the joining surface J1 extends away from the connecting passage 141 like a flange into the air-intake space 40 in a disconnected state shown in FIG. 10(a). The flexible lip 142 curves toward the air-intake space 40 when the flexible circumferential side part 144 is bent.

Since the sealing member 140 is provided with the hollow 146, the flexible circumferential side part 144 has a thin wall 144a capable of being easily bent. A similar thin wall 144a is provided on the radially outer side part of the sealing member 140.

The inside surface 145 of the sealing member 140 has a sealing surface 145a. The sealing surface 145a faces the joining surface J1 in a direction in which an intake suction air pressure (negative pressure) acts in the connecting passage 141 in the connected state in which the sealing member 140 is clamped between the circumferential edge 15m and the downstream entrance duct 62 and in which no negative pressure is acting on the inside surface 145. In this state, the sealing surface 145a and the joining surface J1 forms a space 141a continuous with the connecting passage 141.

The sealing member 140, which seals the opening 15c, the downstream inlet passage 61i and the connecting passage 141 from the air-intake space 40, has the inside surface 145 facing the connecting passage 141, and an outside surface exposed to the air-intake space 40 surrounding the connecting passage 141. Part of the sealing surface 145a is a part of the flexible circumferential side part 144.

The negative suction air pressure acts in a direction perpendicular to the sealing surface 145a, so that the lip 142 is pressed against the joining surface J1. Consequently, the lip 142 is pressed against the joining surface J1 by both the elasticity of the sealing member 140 and the additional negative suction air pressure.

Figure 9:
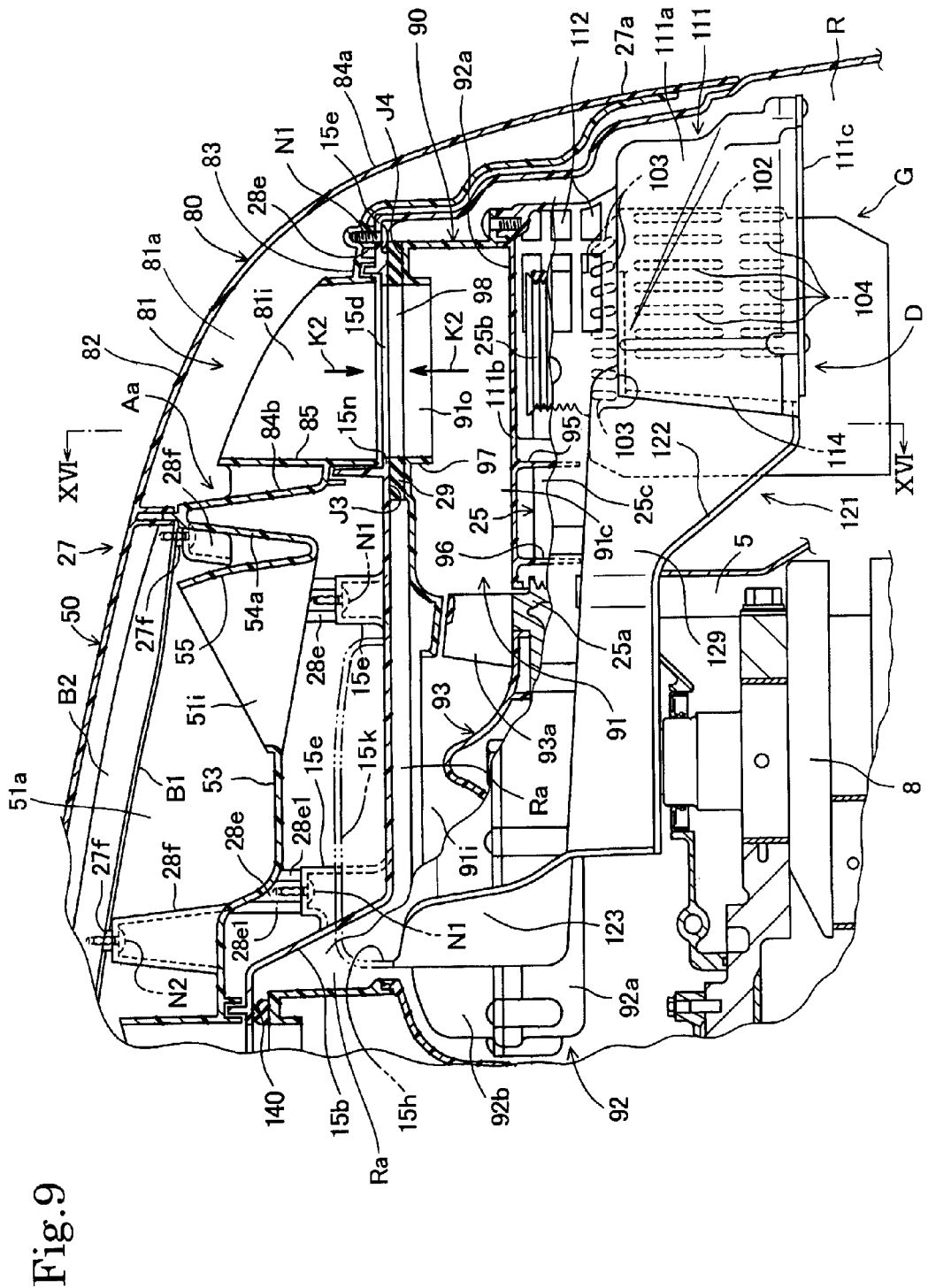
FIG. 9 is an enlarged sectional view of FIG. 2, showing a part around a discharge passage member, in which an air guide structure is partly shown.

Referring to FIGS. 8 and 9, the upstream entrance duct 55 and the upstream exit duct 56 formed integrally with the lower wall 53, which is a part of the intermediate cover 28, do not extend downward from the lower wall 53 but extend upward into the upstream expansion chamber 51a from the lower wall 53. The upstream entrance duct 55 restrains water from flowing into the upstream expansion chamber 51a, and the upstream exit duct 56 restrains water from flowing into the downstream inlet passage 61i and the intake passage. The upstream entrance duct 55 is tilted rearward. Intake air flows obliquely upward through the upstream inlet passage 51i and rearward toward the upstream outlet passage 51o. Thus, the intake air flows smoothly from the upstream inlet passage 51i and the passage resistance of the upstream intake passage 51 is low. The upstream end 51o1 of the upstream outlet passage 51o extending vertically upward from the lower wall 53 into the upstream expansion chamber 51a opens rearward. Therefore, water is restrained from flowing from the upstream inlet passage 51i through the upstream expansion chamber 51a into the upstream outlet passage 51o.

The top wall 15b has a protruding part 15p protruding upward into the air-intake space 40. The protruding part 15p is between the air-intake opening 42 and the upstream inlet end 51i1 with respect to the longitudinal direction and at the same lateral position as the upstream end 51i1.

Figure 11:
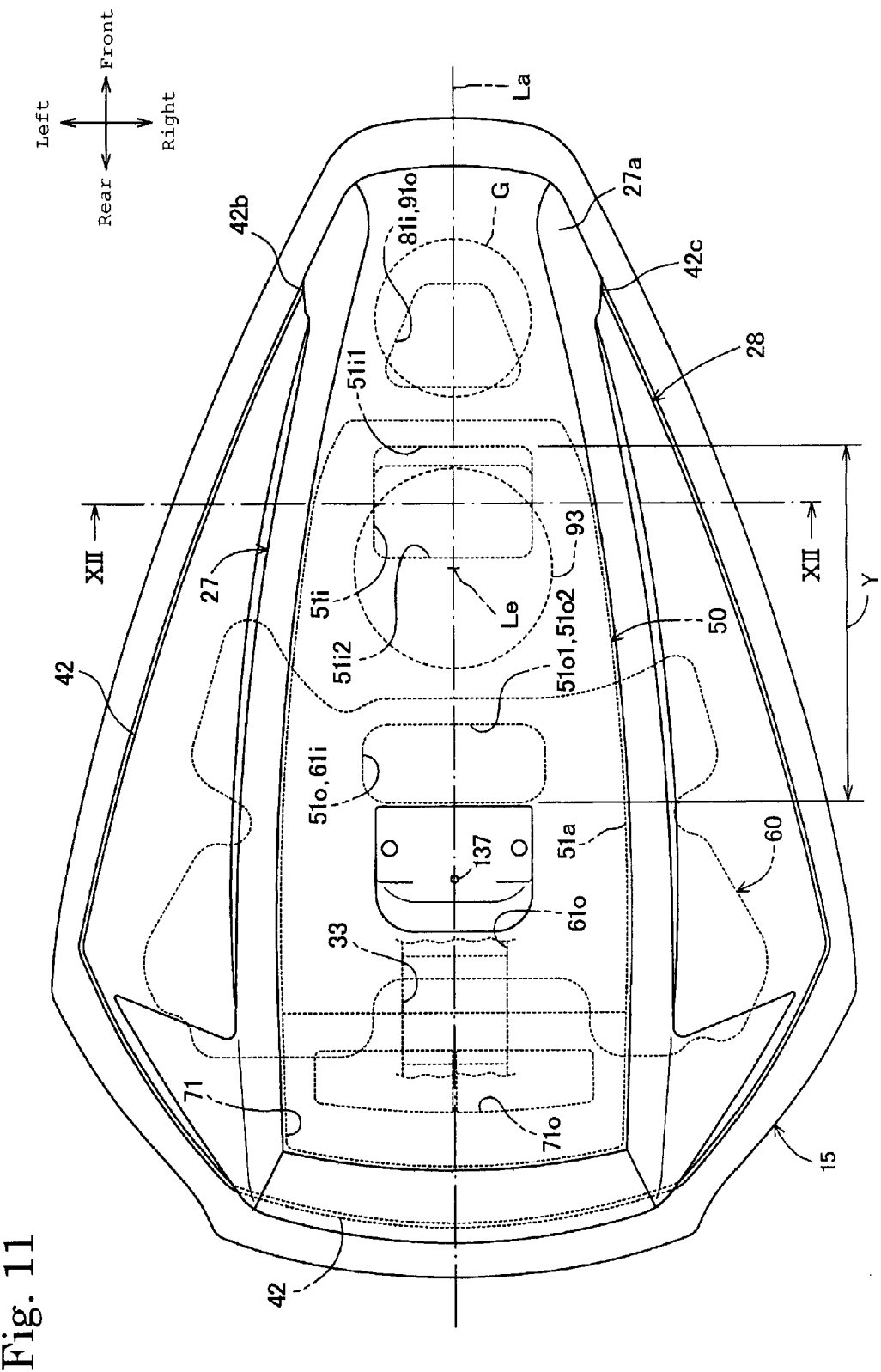
FIG. 11 is a schematic top plan view of the outboard motor shown in FIG. 1.

Referring to FIGS. 8, 9 and 11, the air-intake opening 42 extends at a level lower than that of the upstream intake silencer 50 or the upstream expansion chamber 51a and the upstream end 51i1. The air-intake opening 42 extends in a U-shape on the rear, the right and the left side of the upstream intake silencer 50 or the upstream expansion chamber 51a in a plane. Therefore, the air-intake opening 42 opens rearward at the rear end of the air-intake space 40.

The respective front ends 42b and 42c of the left and the right parts of the air-intake opening 42 are on the front side of the upstream outlet passage 51o, the center axis Le, the upstream inlet passage 51i, and the upstream intake silencer 50 or the upstream expansion chamber 51a. Thus, the right and the left side part of the air-intake opening 42 on the right and the left side of the upstream end 51i1 and the downstream end 51o2 of the upstream outlet passage 51o extend longitudinally beyond the front and the rear end of a longitudinal range Y in which the upstream end 51i1 and the downstream end 51o2 are arranged. The air-intake opening 42 extends on the right and the left side of the upstream end 51i1 in a longitudinal range from the cylinder heads 2 and the valve covers 3 to a position on the front side of the center axis Le.

Thus, the air-intake opening 42 extending around the lower end of the air-intake space 40 can be formed in a long length. Therefore, even though the air-intake opening 42 is formed in a small width W, intake air can be taken in at a necessary intake rate.

Figure 12:
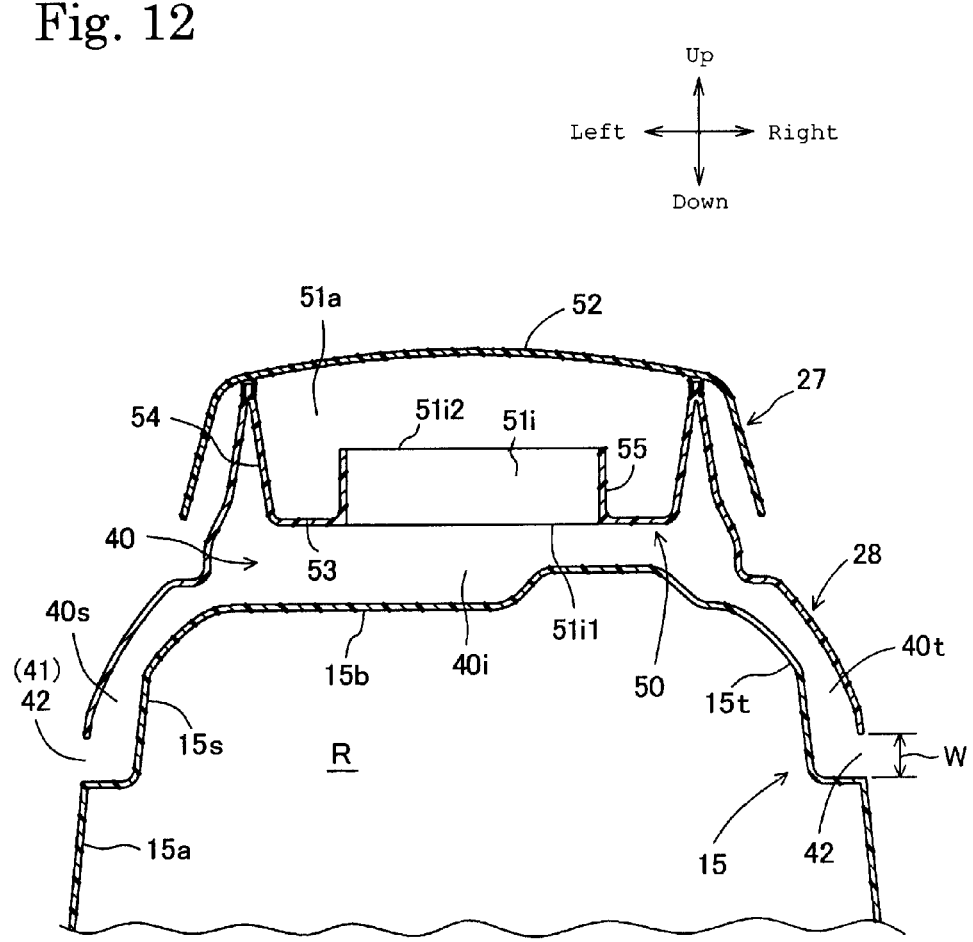
FIG. 12 is a sectional view taken on the line XII-XII in FIG. 11.

Referring to FIGS. 5 and 12, the top wall 15b of the engine cover 15 rises from the vicinity of the peripheral opening 41 or the air-intake opening 42. The top wall 15b has a right side wall 15t and the left side wall 15s. In FIG. 5, the side walls 15t and 15s are shaded by two-dot chain lines. The air-intake space 40 has a right rising space 40t extending between the intermediate cover 28 and the right side wall 15t, and a left rising space 40s extending between the intermediate cover 28 and the left side wall 15s. The right rising space 40t and the left rising space 40s extend upward from the air-intake opening 42. The rising spaces 40t and 40s are in a longitudinal range between the air-intake opening 42 and the upstream inlet passage 51i. Respective upper parts of the rising spaces 40t and 40s connect to an upper part 40i of the air-intake space 40 into which the upstream inlet passage 51i opens.

Referring to FIG. 2, the entrance ventilation structure 70 forming the inlet ventilation passage 71 is contiguous with the rear end of the upstream expansion chamber 51a of the upstream intake passage 51. The entrance ventilation structure 70 has an upper wall 72, which is a part of the top cover 27, a lower wall 73, which is a part of the intermediate cover 28, and a side wall 74, which is a part of the top cover 27 or the intermediate cover 28, extending between the upper wall 72 and the lower wall 73. The side wall 74 has a front part 74a, a left part 74c (FIG. 4) and a right part 74d (FIG. 6) standing upward from the lower wall 73, and a rear part 74b extending obliquely downward from the upper wall 72.

As shown in FIG. 2, the inlet ventilation passage 71 has a main chamber 71a, an inlet passage 71i (see also FIG. 6) formed in the rear part 74b and opening rearward, and an outlet passage 71o formed by an exit duct 76 and connecting to a ventilation air inlet opening Ri. Air flows from the main chamber 71a through the outlet passage 71o and the ventilation air inlet opening Ri into the engine compartment R. The ventilation air inlet opening Ri is formed in the top wall 15b. In other words, the ventilation air inlet Ri opens into the outlet passage 71o which is located outside the engine compartment R. The sectional area of the main chamber 71a is greater than those of the inlet passage 71i and the outlet passage 71o.

The exit duct 76 is formed integrally with the lower wall 73, which is a part of the intermediate cover 28, and extends upward into the main chamber 71a and downward into the ventilation air inlet opening Ri. The exit duct 76 prevents water from flowing through the ventilation air inlet opening Ri into the engine compartment R. A baffle 75 formed integrally with the intermediate cover 28 extends downward in the main chamber 71a. The baffle 75 is so disposed that water flowing together with air through the inlet passage 71i impinges thereon to restrain water from flowing into the inlet passage 71o and the engine compartment R.

The inlet ventilation passage 71 is an air passage extending between the outside and the inside of the engine compartment R.

Referring to FIG. 9, the exit ventilation structure 80 is located contiguous with the front end of the upstream expansion chamber 51a and forms the outer outlet ventilation space 81. The exit ventilation structure 80 has an upper wall 82, which is a part of the top cover 27, a lower wall 83, which is a part of the intermediate cover 28, and a side wall 84, which is a part of the top cover 27 and the intermediate cover 28, extending between the upper wall 82 and the lower wall 83. The whole exit ventilation structure 80, i.e., the whole outer outlet ventilation space 81 including the outlet passage 81o, is on the opposite side of the cylinder heads 2 with respect to the center axis Le of the crankshaft 8; that is, the exit ventilation structure 80 is on the front side of the center axis Le. The side wall 84 has a front part 84a extending downward from the upper wall 82, a left part 84c (FIG. 4), a right part 84d, and a rear part 84b. The front part 84a, the left part 84c and the right part 84d are a part of the top cover 27. The rear part 84b is a part of the intermediate cover 28.

The outer outlet ventilation space 81 has the main part 81a, an inlet passage 81i formed by an entrance duct 85, and an outlet passage 81o formed by an exit duct 86 (FIG. 4). Air flows from an outlet ventilation passage 91o through the inlet passage 81i into the main chamber 81a. Air flows from the main chamber 81a through the outlet passage 81o and is discharged rearward from the outboard motor S. The inlet passage 81i opens into an opening 15d formed in the top wall 15b and opens through the opening 15d and an annular sealing member 29 into the outlet ventilation passage 91o. The sectional area of the main chamber 81a is greater than those of the inlet passage 81i and the outlet passage 81o.

The spongy sealing member 29 (refer also to FIG. 13) made of rubber is clamped between a passage forming part 15n and an exit duct 97 forming an outlet ventilation passage 91o. The passage forming part 15n is formed integrally with the top wall 15b of the engine cover 15 and provided with an opening 15d. The exit duct 97, namely, an outlet passage forming member, is formed integrally with an upper case 92b, which is a part of the exit ventilation structure 90. The sealing member 29 forms a passage 98 connecting the opening 15d of the upstream inlet passage 81i, and the outlet ventilation passage 91o. The passage forming part 15n, namely, a first passage forming member, and the exit duct 97, namely, a second passage forming member, clamps the sealing member 29 when the assembly of the top cover 27, the intermediate cover 28 and the engine cover 15 is joined to the lower cover 14 (FIG. 1).

The passage forming part 15n and the exit duct 97 have joining surfaces J3 and J4, respectively, facing each other with respect to joining directions K2. The sealing member 29 is in close contact with the joining surfaces J3 and J4 to seal the gap between the passage forming part 15n and the exit duct 97. The joining surfaces J3 and J4 are substantially perpendicular to the joining directions K2 or a main air flow flowing from the outlet ventilation passage 91o through the passage 98, the opening 15d and the inlet passage 81i.

As shown in FIG. 9, the entrance duct 85 formed integrally with the lower wall 83, which is a part of the intermediate cover 28, extends upward into the main chamber 81a and extends downward into the opening 15d. The entrance duct 85 thus formed restrains water from flowing into the outlet ventilation passage 91o and an inner outlet ventilation space 91. As shown in FIG. 4, the exit duct 86 has a part 86c formed of the left part 86c and a front left part 28c of the intermediate cover 28, and a part 86d formed of the right part 84d and a front right part 28d of the intermediate cover 28. The outlet passage 81o is formed by the parts 86c and 86d, and opens rearward into the atmosphere (refer also to FIG. 5).

Referring to FIGS. 2, 4 and 8, the intermediate cover 28 is a frame structure having an upwardly convex wall A (FIG. 8) of double-wall construction having an upwardly convex longitudinal section. The frame structure has a pair of longitudinal side walls Ac and Ad, and a pair of lateral end walls Aa and Ab joining to the longitudinal walls Ac and Ad. The intermediate cover 28 of double-wall construction is rigid.

The side walls 54, 74 and 84 forming the inlet ventilation passage 71 and the outer outlet ventilation space 81 form the upward convex wall A. More concretely, the front and rear parts 54a and 84a are parts of the end wall Aa. Similarly, the rear and front parts 54b and 74a are parts of the end wall Ab. The left parts 54c and 74c are parts of the side wall Ac. The right parts 54d and 74d are parts of the side wall Ad. A space between the two walls of the upward convex wall A is a part of the air-intake space 40.

An annular protrusion B1 (FIG. 2) and the baffle wall 75 formed integrally with a top part of the upward convex wall A are fitted in recesses B2 formed by a pair of annular protrusions in the top cover to ensure the airtightness of the upstream intake passage 51, the inlet ventilation passage 71 and the outer outlet ventilation space 81.

Referring to FIGS. 1 to 3, the intake system 30 forms the intake passage for carrying intake air from the air-intake passage through the intake ports into the combustion chambers 22. The intake system 30 includes the downstream intake silencer 60 disposed above the engine body, and a throttle device 31 connected to the downstream intake silencer 60. The throttle device 31 is disposed above the engine body and provided with a throttle valve 31a for regulating the flow of intake air. The intake system 30 also includes an intake manifold 32 connected to the throttle device 31. The upstream intake silencer 50 and the downstream intake silencer 60 are combined in a vertical arrangement. The upstream intake silencer, is an upstream intake silencer disposed above the downstream intake silencer 60, namely, a lower intake silencer.

Referring to FIG. 2, the intake passage extends continuously in the engine compartment R from the downstream inlet passage 61i to the intake ports. The intake passage has a downstream intake passage 61 formed in the downstream intake silencer 60, a throttle passage 33 formed by the throttle body of the throttle device 31 and provided with the throttle valve 31a, and a downstream intake passage 34 formed in the intake manifold 32 and communicating with the downstream intake passage 61 by means of the throttle passage 33. Air flows from the downstream intake passage 34 through the outlet of the intake passage into the intake ports. Air is sucked through the intake ports into the combustion chambers 22. The throttle passage 33 extends longitudinally along a straight line La (FIG. 11) in a plane. In this embodiment, the straight line La intersects the center axis Le and is along the longitudinal directions.

The air-intake passage 40, the upstream intake passage 51 having the upstream outlet passage 51o, the opening 15c, the connecting passage 141, and the intake passage having the downstream inlet passage 61i form an intake air passage continuously extending from outside the engine compartment R into the engine compartment R.

Referring to FIGS. 2 and 3, the downstream intake silencer 60 includes a lower case 60a, namely, a first case covering the camshaft valve train driving mechanism 24 from above, and an upper case 60b, namely, a second case, closely joined to and fastened with screws to the lower case 60a. In assembling step, the downstream intake silencer 60 is moved forward to its predetermined position after the outlet ventilation passage forming the exit ventilation structure 90 has been attached to the engine body. Holding parts of the lower case 60a are detachably attached to the respective upper ends of the cylinder block 1, the cylinder heads 2 and the valve covers 3.

Referring to FIG. 8, the downstream intake silencer 60 has a wall 66 forming a downstream expansion chamber 61a, the downstream entrance duct 62 forming the downstream inlet passage 61i, and a downstream exit duct 63 forming the downstream outlet passage 61o. The wall 66, the downstream entrance duct 62 and the downstream exit duct 63 form the downstream intake passage 61.

The downstream entrance duct 62 and the downstream inlet passage 61i extend vertically, and the downstream exit duct 63 and the downstream outlet passage 61o are parallel to the longitudinal direction.

An upper wall 67 of the downstream intake silencer 60 is a stepped wall having a raised part 67a and a lowered part 67b. The raised part 67a underlies the second raised part 53a2 of the lower wall of the upstream expansion chamber 51a. The lowered part 67b underlies the first high part 53a1 of the lowered wall 53 and extends at a level lower than that of the raised part 67a. The downstream entrance duct 62 and the downstream inlet passage 61i are formed in the lowered part 67b. The downstream exit duct 63 and the downstream outlet passage 61o are disposed under the raised part 67a at a level lower than that of the raised part 67a.

The upstream intake silencer 50 is disposed immediately above the top wall 15b, and the downstream intake silencer 60 is disposed immediately below the top wall 15b. The protruding part 15p of the top wall 15b extends under the second raised part 53a2 and the first raised part 53a1 of the lower wall 53 and over the raised part 67a and the lowered part 67b of the upper wall 67. The protruding part 150 protrudes upward in a shape conforming to those of the second raised part 53a2, the first raised part 53a1, the raised part 67a and the lowered part 67b. The protruding part 15p extends in a space between the raised part 53a and the upper wall 67 and is on the rear side of the upstream inlet passage 51i.

The downstream inlet passage 61 includes the downstream expansion chamber 61a, namely, an expanded intake silencing chamber, the downstream inlet passage 61i formed by the downstream entrance duct 62 and connecting to the air-intake space 40 and the downstream expansion chamber 61a, and the downstream outlet passage 61o formed by the downstream exit duct 63 connecting the downstream expansion chamber 61a to the throttle passage 33. The sectional area of the downstream expansion chamber 61a of the downstream intake silencer 60, into which intake air flows from the upstream intake silencer 50 through the downstream inlet passage 61i is greater than those of the downstream inlet passage 61i and the downstream outlet passage 61o. The downstream inlet passage 61i does not open into the engine compartment R and connects directly to the upstream intake passage 51 outside the engine compartment R. A flame trap 64 made from a metal net is disposed on the upstream side of the downstream outlet passage 61o in the downstream expansion chamber 61a. The flame trap 64 traps flame when back fire occurs.

Referring to FIG. 2, the ventilation system includes the entrance ventilation structure 70 for carrying external air into the engine compartment R, the exit ventilation structure 90 forming the inner outlet ventilation space 91 (FIG. 9) for carrying, to the outside of the engine compartment R, hot air heated by heat radiated from the internal combustion engine E and the associated devices in the engine compartment R, and the exit ventilation structure 80 for carrying the hot air flowing out from the exit ventilation structure 90 to the outside of the outboard motor S.

Ventilation air flows through the inlet ventilation passage 71 outside the engine compartment R, the outlet passage 71o and the ventilation air inlet Ri into the engine compartment R. The ventilation air is guided to a space behind the intake manifold 32, the valve covers 3 and the cylinder heads 2 by a guide plate 65 formed integrally with the upper case 60b of the downstream intake silencer 60. Part of the ventilation air that has worked for cooling the intake system 30, the valve covers 3, the cylinder heads 2, the cylinder blocks 1 and the crankshaft cover 4 flows as cooling air into the alternator G held on the crankshaft cover 4 by a bracket 5a (FIG. 2). While the ventilation air that has passed through the ventilation air inlet Ri is flowing from a space behind the engine body toward a space in front of the engine body, the ventilation air cools the cylinder heads 2 and the cylinder blocks 1 forming the combustion area. Thus the ventilation air works efficiently as cooling air. The guide plate 65 is formed integrally with the downstream intake silencer 60 and hence does not increase the number of the component parts of the outboard motor S.

Referring to FIG. 9, the exit ventilation structure 90 overlying the accessory driving mechanism 25 includes a case 92 formed by fastening the upper case 92b, namely, a second case, to a lower case 92a, namely, a first case, with screws in an airtight fashion, a centrifugal fan 93, namely, a blowing means, placed in the inner outlet ventilation space 91 formed by the lower case 92a and the upper case 92b to deliver air by pressure to the outer outlet ventilation space 81. When mounting the exit ventilation structure 90, it is moved from the front side and fixed to its position. The exit ventilation structure 90 is detachably fastened to the respective upper ends of the cylinder blocks 1 and the crankshaft cover 4 at holding parts F (FIG. 14) of the case 92 and a cover 111, which will be described later.

In FIG. 9, the inner outlet ventilation space 91 is formed in an upper space Ra (FIG. 7) in the engine compartment R. The inner outlet ventilation space 91 has an inlet ventilation passage 91i opening upward, the outlet ventilation passage 91o connecting to the inlet passage 81i of the outer outlet ventilation space 81, and an outlet passage 91c for carrying air blown by the fan 93 into the outlet ventilation passage 91o. The upper space Ra extends under and along the top wall 15b of the engine cover 15 and is positioned at a level above the upper end of the crankshaft 8, the alternator G and the driving mechanisms 24 and 25. The fan 93 is provided with a plurality of blades 93a and fastened to the upper end of the accessory drive pulley 25a with bolts, not shown, for rotation together with the accessory drive pulley 25a, which is fixedly mounted on the upper end part of the crankshaft 8. A part on the side of the outlet ventilation passage 91o of the fan 93 overlaps the upstream inlet passage 51i in a plane.

The inlet ventilation passage 91i and the outlet ventilation passage 91o are formed in the upper case 92b. The inlet ventilation passage 91i is formed under and vertically separated from the top wall 15b and disposed in a space above the crankshaft cover 4 in which hot air heated by the cylinder heads 2 and the cylinder blocks 1 tends to collect. Air of a comparatively high temperature which has cooled the engine body and the alternator G in the engine compartment R flows into the inlet ventilation passage 91i.

The outlet passage 91c of the inner outlet ventilation space 91 and the outer outlet ventilation space 81 are disposed at the same longitudinal position as the alternator G. The outer outlet ventilation space 81, the outlet passage 91c and the alternator G are superposed in a plane.

The inner outlet ventilation space 91 having the outlet ventilation passage 91o, the passage 98, the opening 15d, and the outer outlet ventilation space 81 having the inlet passage 81i form a ventilation passage extending between the outside of the engine compartment R and the inside of the engine compartment R. Ventilation air flows through the ventilation passage.

Referring to FIG. 8, the downstream outlet passage 61o is on the opposite side of the upstream inlet passage 51i with respect to the upstream outlet passage 51o and the downstream inlet passage 61i. As shown in FIG. 11, the upstream outlet passage 51o, the downstream inlet passage 61i and the downstream outlet passage 61o are arranged across the straight line La crossing the upstream inlet passage 51i and the throttle passage 33 in a plane.

Referring to FIG. 2, the inlet passage 71i, the outlet passage 71o, the ventilation air inlet opening Ri, the upstream outlet passage 51o, the downstream inlet passage 61i, the downstream outlet passage 61o, the upstream inlet passage 51i, the outlet ventilation passage 91o and the inlet passage 81i are arranged in that order in a forward direction on a longitudinal straight line in a plane. The upstream inlet passage 51i is on the front side of the upstream outlet passage 51o and the downstream inlet passage 61i. The inlet passage 71i, the outlet passage 71o, the ventilation air inlet opening Ri, the upstream outlet passage 51o and the downstream inlet passage 61i are arranged in a space near the cylinder heads 2 on the rear side of the center axis Le. The upstream inlet passage 51o, the outlet ventilation passage 91o, the inlet passage 81i and the outlet passage 81o are arranged in a space near the crankcase 5 on the front side of the center axis Le. The top cover 27 covers the upstream outlet passage 51o, the upstream inlet passage 51i and the inlet passage 81i from above.

The exit ventilation structure 90 is disposed near the center axis Le on the opposite side of the inlet passage 71i, the outlet passage 71o and the ventilation air inlet opening Ri with respect to the downstream intake silencer 60. A major part of the exit ventilation structure 90 is formed near the center axis Le on the front side of the upstream outlet passage 51o and the downstream inlet passage 61i. Thus, the downstream intake silencer 60 is disposed on the side of the cylinder heads 2 or in a rear part of the outboard motor S on the rear side of the engine body. The exit ventilation structure 90 is disposed on the side of the crankcase 5 or in a front part of the outboard motor S on the front side of the engine body.

The downstream intake silencer 60 and the exit ventilation structure 90 are separate structures and are separate from the engine cover 15. Therefore, there are not many restrictions on the respective shapes of the downstream intake silencer 60 and the exit ventilation structure 90. For example, the downstream inlet passage 61i and the downstream outlet passage 61o of the downstream intake silencer 60 can be formed at a short distance from each other to improve intake efficiency. The downstream intake silencer 60 can be disposed in a space through which air of a comparatively low temperature flows in the engine compartment R, while the exit ventilation structure 90 can be disposed in a space through which air of a comparatively high temperature which has cooled the cylinder heads 2 and the cylinder blocks 1 flows in the engine compartment R. The inlet ventilation passage 91i and the outlet ventilation passage 91o can be formed at a short distance from each other to improve intake efficiency.

Referring to FIG. 2, the alternator G includes a rotor shaft 101 (FIGS. 3 and 13) rotationally driven through the accessory driving mechanism 25 by the crankshaft 8, and a housing 102 housing a rotor mounted on the rotor shaft 101. The rotor is provided with a cooling fan, not shown, for taking air into the housing 102. The housing 102 is provided with inlet openings 103 (FIG. 9) through which cooling air is taken into the housing 102 by the cooling fan to cool the interior of the alternator G, and outlet openings 104 through which cooling air that has worked for cooling the interior of the alternator G is discharged.

Referring to FIG. 9, the alternator G is surrounded by an air guide structure D. The air guide structure D guides cooling air flowing into the alternator G and cooling air that has worked for cooling the interior of the alternator G and discharged from the housing 102 toward the inlet ventilation passage 91i. The air guide structure D and the exit ventilation structure 90 are united to form an air discharge structure.

The air guide structure D has a cover 111 extending over the inlet openings 103 and the outlet openings 104 so as to surround the housing 102, and a guide wall 121, namely, a guide member, for guiding air discharged from the alternator G through the outlet openings 104 into a guide space 113 (FIG. 2) defined by the cover 111 and the housing 102 toward the inlet ventilation passage 91i of the inner outlet ventilation space 91. The cover 111 and the guide wall 121 are united together and are formed integrally with the lower case 92a.

As shown in FIG. 9, the cover 111 has a circumferential wall 111a, an upper wall 111b and a lower wall 111c. The circumferential wall 111a extends vertically along the center axis Lg (FIG. 13) of the rotor shaft 101 of the alternator G and circumferentially about the center axis Lg on the front, right and left sides of the housing 102. The upper wall 111b is joined to the upper end of the circumferential wall 111a. The lower wall 111c is joined to the lower end of the circumferential wall 111a.

A plurality of slits 112 are formed in an upper part of the circumferential wall 111a. Air flows from the engine compartment R through the slits 112 into the guide space 113. The upper wall 111b is a part of a wall demarcating the outlet passage 91c.

The lower wall 111c is a flat plate fastened to the lower end of the cover 111 with screws.

Figure 13:
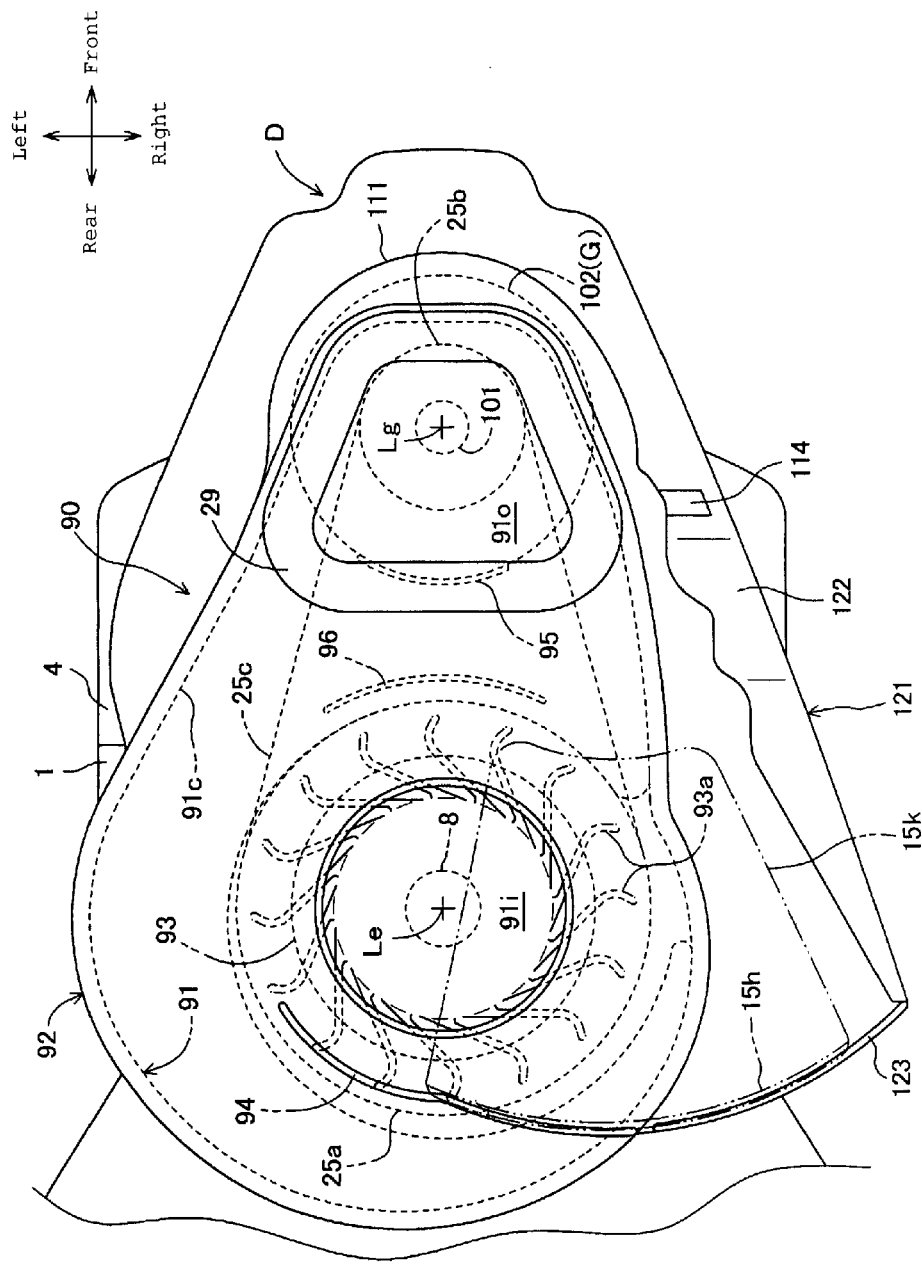
FIG. 13 is a top plan view of essential members forming the discharge passage and the air guide structure included in the outboard motor shown in FIG. 1.
Figure 14:
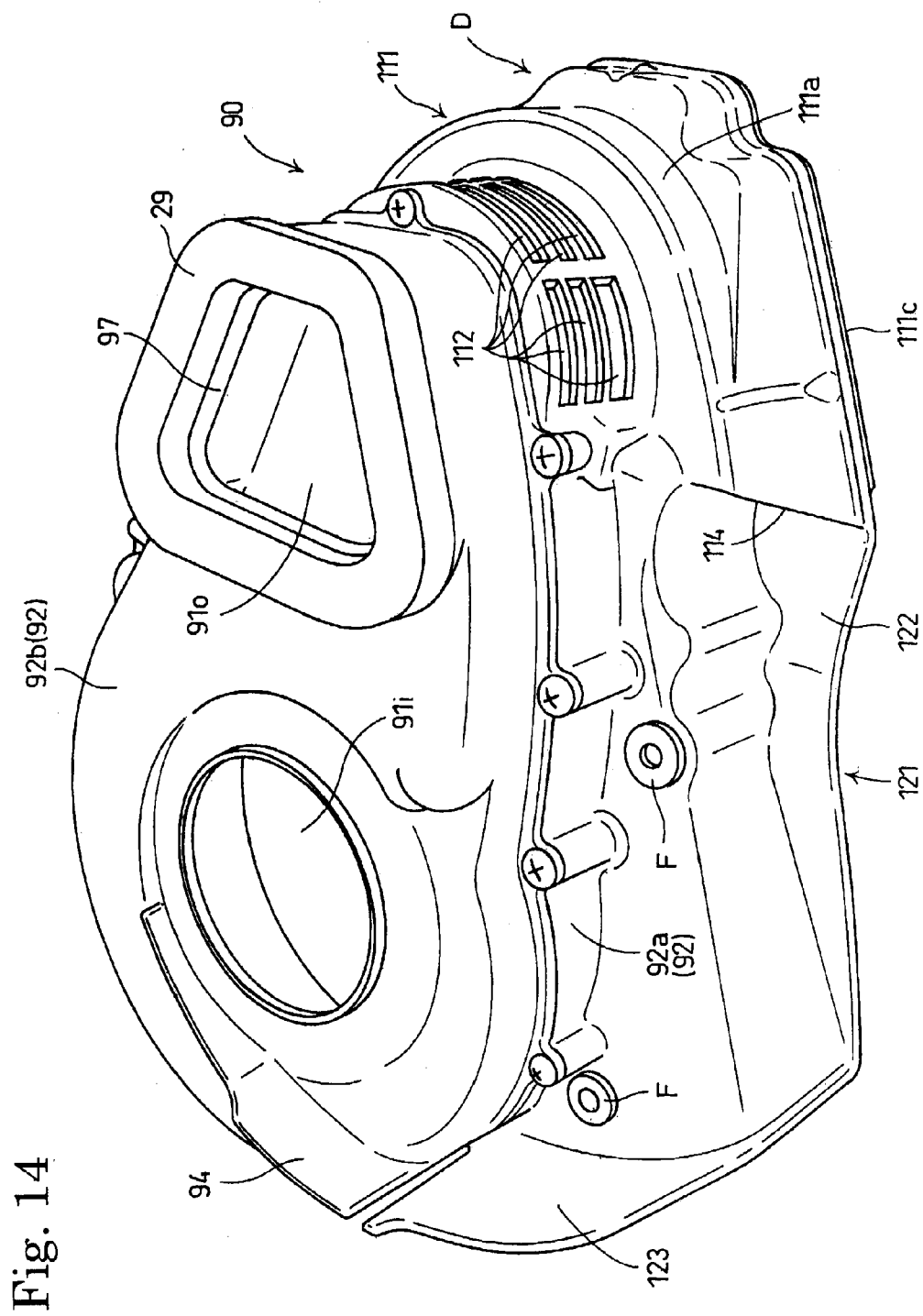
FIG. 14 is a perspective view of the members forming the discharge passage and the air guide structure included in the outboard motor shown in FIG. 1 taken from above those members.
Figure 15:
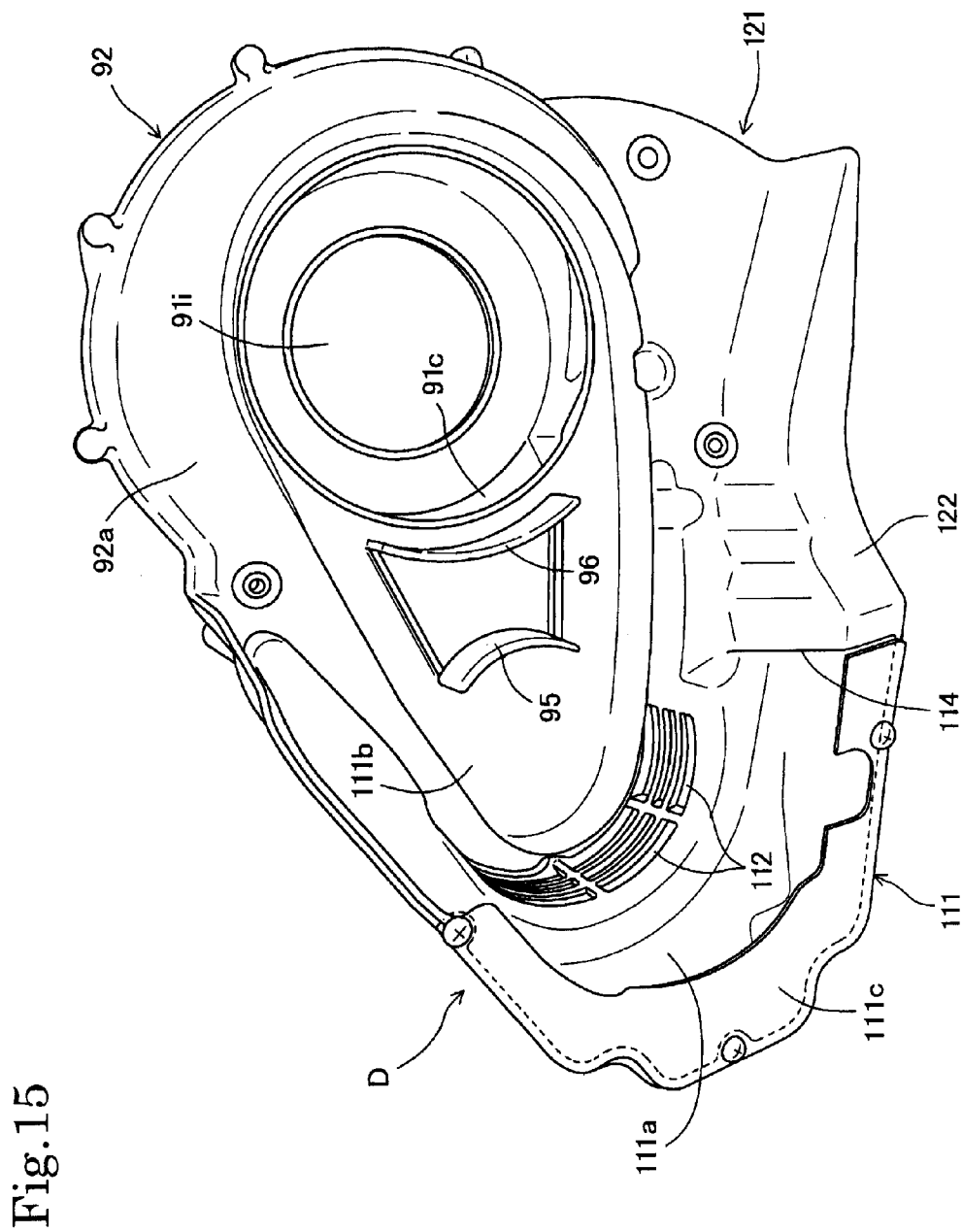
FIG. 15 is a perspective view of the members forming the discharge passage and the air guide structure included in the outboard motor shown in FIG. 1 taken from below those members.

Air flowing out through the outlet openings 104 is restrained from flowing upward from the guide space 113 by the upper wall 111b, is restrained from flowing downward from the guide space 113 by the lower wall 111c and is guided toward a discharge opening 114, which will be described later. As shown in FIGS. 9, 11 and 13, the upper wall 111b is provided with a pair of baffle walls 95 and 96. The baffle walls 95 and 96 prevent cooling air flowing through the slits 112 into the guide space 113 from being sucked into the fan 93 and prevent air from being directly sucked from the guide space 113 into the fan 93 instead of flowing through the discharge opening 114. Thus the upper wall 111b, the lower wall 111c and the baffle walls 95 and 96 ensure discharging air efficiently from the guide space 113 through the discharge opening 114.

Figure 16:
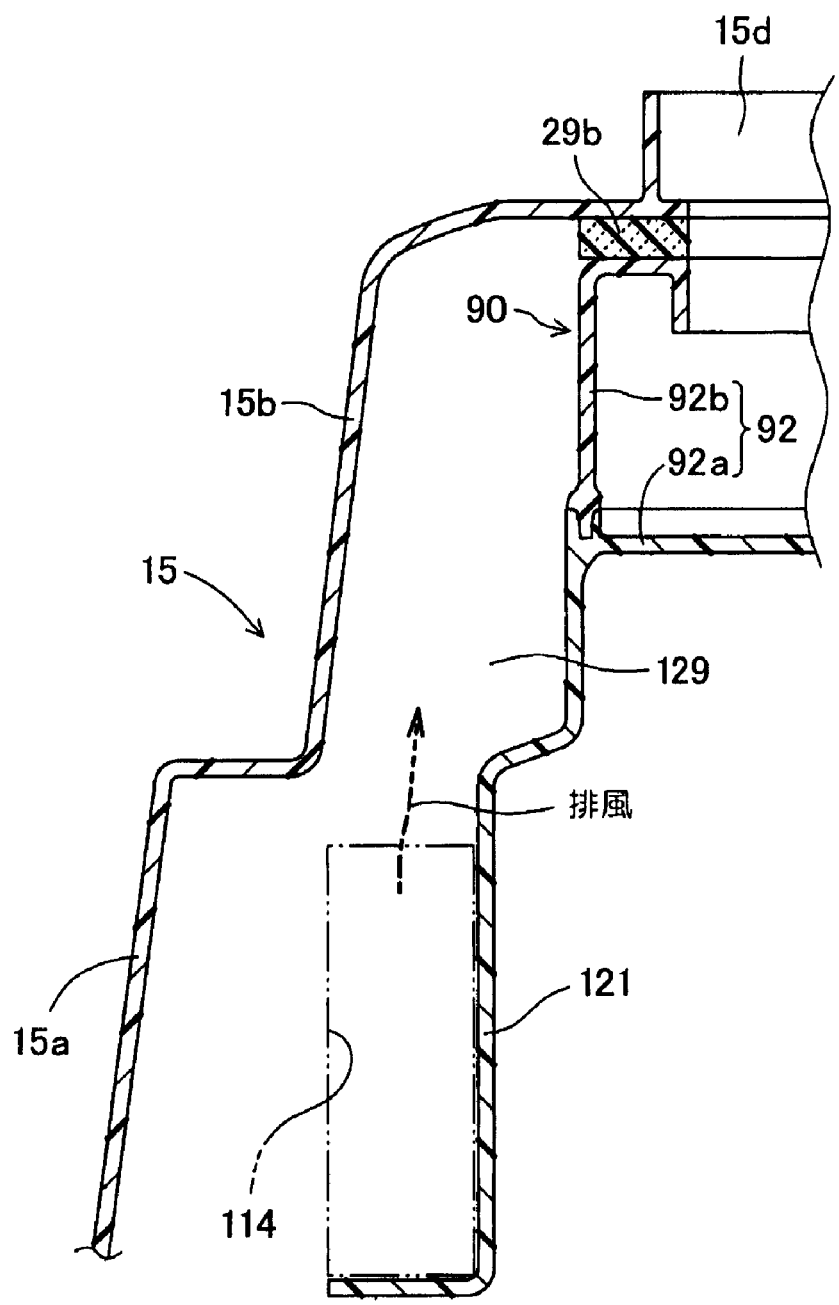
FIG. 16 is a sectional view taken on the line XVI-XVI in FIG. 9.

The discharge opening 114 is formed in a lower part of the circumferential wall 111a of the cover 111 at a position corresponding to the rear end of the alternator G on the right side of the alternator G. Referring also to FIG. 16, the discharge opening 114 is formed such that air is discharged from the annular guide space 113 tangentially thereto and clockwise as viewed in FIG. 3 through the discharge opening 114 into a guide passage 129 formed by the guide wall 121 and the engine cover 15 so as to flow rearward toward the inlet ventilation passage 91i disposed on the rear side of the alternator G.

The guide wall 121 has an inclined part 122 (FIG. 9) sloping upward to guide air discharged through the discharge opening 114 toward the inlet ventilation passage 91i at a level higher than that of the discharge opening 141, and a deflecting part 123 for deflecting air flowing through the guide passage 129 toward the inlet ventilation passage 91i and the center axis of the fan 93 aligned with the center axis Le. Air deflected by the deflecting part 123 is guided toward the inlet ventilation passage 91i by a vertical deflecting wall 94 (FIG. 2) formed integrally with the upper case 92b. The top wall 15b of the engine cover 15 is integrally provided with a deflecting wall 15h (FIGS. 3, 9 and 13) and a covering wall 15k. The deflecting wall 15h extends down opposite to the deflecting walls 13 and 94. The covering wall 15k covers the inlet ventilation passage 91i from above. In FIG. 13, the deflecting wall 15h is dislocated from the position corresponding to the deflecting walls 123 and 94 to facilitate understanding. The deflecting wall 15h guides efficiently air discharged through the discharge opening 114 toward the inlet ventilation passage 91i and prevents the air discharged through the discharge opening 114 from obstructing air to flow toward the inlet ventilation passage 91i in the engine compartment R. The covering wall 15k, namely, an upwardly protruding part of the top wall 15b, covers a major part on the side of the guide passage 129 of the sectional area of the inlet ventilation passage 91i in a plane (FIGS. 4 and 13), and a part on the side of the inlet ventilation passage 91i of the guide passage 129 from above.

The operation and effect of the outboard motor S in the preferred embodiment will be described.

In the outboard motor S provided with the internal combustion engine E having the combustion chambers 22, the upper upstream intake silencer 50 into which intake air flows and the lower downstream intake silencer 60 through which intake air flows into the combustion chambers 22 are put one on top of the other. The upstream intake silencer 50 above the downstream intake silencer 60 has the upstream inlet passage 51i, the upstream expansion chamber 51a and the upstream outlet passage 51o. The downstream intake silencer 60 has the downstream inlet passage 61i connected to the upstream outlet passage 51o, the downstream expansion chamber 61a, and the downstream outlet passage 61o. The lower wall 53 of the upstream expansion chamber 51a is a stepped wall having the raised part 53a overlapping the downstream intake silencer 60 in a plane, and the lowered part 53b separated from the downstream intake silencer 60 in a plane and at a level lower than that of the raised part 53a. The upstream outlet passage 51*o* is formed in the raised part 53*a* of the lower wall 53. The upstream outlet passage 51*o* is formed in the raised part 53*a*.

Since the lowered part 53*b* of the stepped lower wall 53 of the upstream intake silencer 50 does not overlap the downstream intake silencer 60, the lowered part 53*b* can be extended downward. Therefore, the upper expansion chamber 51*a* can be formed in an increased volume and hence the upstream intake silencer 50 is given a high intake noise reducing effect.

The raised part 53*a* provided with the upstream outlet passage 51*o* connected to the downstream inlet passage 61*i* of the downstream intake silencer 60 is extended immediately above the downstream intake silencer 60 and the downstream intake silencer 60 is disposed in the space underlying the raised part 53*a*. Therefore, the upstream outlet passage 51*o* and the downstream inlet passage 61*i* is connected and the upstream intake silencer 50 and the downstream intake silencer 60 can be disposed vertically close to each other by using the raised part 53*a* of the lower wall 53. Thus the upstream intake silencer 50 and the downstream intake silencer 60 can be compactly superposed, which is effective in forming the outboard motor S in reduced vertical size.

The upper wall 67 of the downstream intake silencer 60 is a stepped wall having the raised part 67*a*, and the lowered part 67*b* overlapping the lower wall 53 of the upstream expansion chamber 51*a* in a plane and extending at a level lower than that of the raised part 67*a*. The downstream inlet passage 61*i* is formed in the lowered part 67*b*. The raised part 67*a* of the stepped upper wall 67 of the downstream intake silencer 60 is at a level higher than that of the lowered part 67*b*. Therefore, the downstream expansion chamber 61*a* can be formed in a large volume and hence the downstream intake silencer 60 is given a high intake noise reducing effect.

The lowered part 67*b* of the stepped upper wall 67, provided with the downstream inlet passage 61*i* connecting to the upstream outlet passage 51*o* of the upstream intake silencer, is disposed directly below the upstream intake silencer 50. The upstream intake silencer 50 is placed in a space extending over the lowered part 67*b* of the upper wall 67. Therefore, the upstream outlet passage 51*o* and the downstream inlet passage 61*i* is connected and the upstream intake silencer 50 and the downstream intake silencer 60 can be disposed vertically close to each other by using the lowered part 67*b* of the upper wall 67. Thus, the upstream intake silencer 50 and the downstream intake silencer 60 can be compactly superposed, which is effective in forming the outboard motor S in reduced vertical size.

The downstream inlet passage 61*i* is formed in the lowered part 67*b* of the upper wall 67 of the downstream intake silencer 60. The lowered wall 53 of the upstream intake silencer 50 and the upper wall 67 of the downstream intake silencer 60 are formed in the stepped shapes complementary to each other. The lowered part 53*b* of the lower wall 53 of the upstream intake silencer 50 does not overlap the downstream intake silencer 60 in a plane. The raised part 67*a* of the upper wall 67 of the downstream intake silencer 60 is at a level higher than that of the lowered part 67*b*. Therefore, the expansion chambers 51*a* and 61*a* can be formed in large volumes, respectively, and hence the intake silencers 50 and 60 are given an increased intake noise reducing effect.

The lowered part 67*b* provided with the downstream inlet passage 61*i* of the upper wall 67 is disposed directly below the first raised part 53*a*1 provided with the upstream outlet passage 51*o*, and the lowered part 67*b* at a level lower than that of the raised part 67*a* underlies the first raised part 53*a*1. Therefore, the upstream outlet passage 51*o* and the downstream inlet passage 61*i* is connected and the upstream intake silencer 50 and the downstream intake silencer 60 can be disposed vertically close to each other by using the first raised part 53*a*1 of the upstream intake silencer 50 and the lowered part 67*b* of the downstream intake silencer overlapping each other in a plane. Thus the upstream intake silencer 50 and the downstream intake silencer 60 can be compactly superposed, which is effective in forming the outboard motor S in reduced vertical size.

The upstream intake silencer 50 and the downstream intake silencer 60 are on the upper side and on the lower side, respectively, of the top wall 15*b* of the engine cover 15. The upstream intake silencer 50 is disposed in the air-intake space 40 formed outside the engine compartment R by the engine cover 15 and the top cover 27 covering the engine cover 15. The downstream intake silencer 60 is disposed inside the engine compartment R. Therefore, the engine cover 15 and the outboard motor S can be formed in small sizes. Therefore, the vibration of the engine cover 15 caused by intake pulsation attenuated by the intake silencers 50 and 60 can be effectively suppressed and hence noise resulting from the vibration of the engine cover 15 caused by intake pulsation can be reduced.

In the outboard motor S provided with the power unit P, the intake device 30 includes the downstream intake silencer 60 forming the downstream intake passage 61. The ventilation system has the exit ventilation structure 90 forming the inner outlet ventilation space 91 having the outlet ventilation passage 91*o* opening into a space outside the engine compartment R. The downstream intake silencer 60 and the exit ventilation structure 90 are separate structures and are separate from the engine cover 15. Both the downstream intake silencer 60 and the exit ventilation structure 90 are disposed in the engine compartment R. Therefore, heat exchange between the intake air flowing through the intake passage including the downstream intake passage 61 and the ventilation air flowing through the inner outlet ventilation space 91 can be suppressed. Thus, the volumetric efficiency of the internal combustion engine E is high, there are few restrictions on the arrangement of the downstream intake silencer and the exit ventilation structure 90 in the engine compartment R, and the degree of freedom of arranging the downstream intake silencer 60 and the exit ventilation structure 90 is large. Therefore, the downstream intake silencer 60 and the exit ventilation structure 90 can be formed in optimum functional shapes, which is effective in improving intake efficiency and ventilation efficiency.

The ventilation air inlet opening Ri opening to the exterior of the engine compartment R is formed on the side of the cylinder heads 2 with respect to the center axis Le. The exit ventilation structure 90 is formed on the opposite side of the ventilation air inlet opening Ri with respect to the downstream intake silencer 60 and at a position near the center axis Le. Air flowing through the ventilation air inlet opening Ri near the cylinder heads 2 into the engine compartment R cools the cylinder heads 2 and the cylinder blocks 1 heated at comparatively high temperatures by combustion in the combustion chambers 22, and then flows into the inner outlet ventilation space 91 formed in the exit ventilation structure 90 disposed near the center axis Le. Thus, air of a comparatively high temperature in the engine compartment R can be discharged from the engine compartment R. Thus, ventilation air cools the internal combustion engine E efficiently and the engine compartment R can be efficiently ventilated.

Each overhead-camshaft valve train 23 is provided with the camshaft 23*a* rotationally driven by the crankshaft 8 through the camshaft driving mechanism 24. The downstream intake silencer 60 and the exit ventilation structure 90 are arranged longitudinally over the camshaft driving mechanism 24. Thus, the downstream intake silencer 60 and the exit ventilation structure 90 form the two-part belt cover structure. Therefore, the downstream inlet silencer 60 can be attached by moving it forward from the rear to dispose the same in place and can be detached by moving it rearward to remove the same, while the exit ventilation structure 90 can be attached by moving it rearward from the front to place the same in place and can be detached by moving it forward to remove the same. Thus, the belt cover structure including the downstream intake silencer 60 and the exit ventilation structure 90 can be easily installed in place.

In the outboard motor S, the intermediate cover 28 is disposed between the engine cover 15 and the top cover 27 with respect to the vertical direction, the first joining protrusions 15e and 28e for joining the engine cover 15 and the intermediate cover 28 together are disposed in the space between the top cover 15 and the intermediate cover 28, and the second joining protrusions 27f and 27g for joining the intermediate cover 28 and the top cover 27 together are disposed in the space between the top cover 27 and the intermediate cover 28. The engine cover 15 and the intermediate cover 28 are joined together by fastening the joining protrusion 15e and 28e in the space between the engine cover 15 and the intermediate cover 28. The top cover 27 and the intermediate cover 28 are joined together by fastening together the joining protrusions 27f and 28f in the space between the top cover 27 and the intermediate cover 28. Thus, the engine cover 15 and the top cover 27 are connected by the intermediate cover 28. Since the intermediate cover 28 is between the engine cover 15 and the top cover 27 with respect to the vertical direction, the space defined by the engine cover 15 and the top cover 27 is divided by the intermediate cover 28, the distance between the engine cover 15 and the intermediate cover 28 and the distance between the intermediate cover 28 and the top cover 27 are shorter than the distance between the engine cover 15 and the top cover 27. Therefore, the joining protrusions 15e, 28e, 27f and 28f are short. Therefore, the joining protrusions 15e, 28e, 27f and 28f can be easily formed in a necessary rigidity. The distance between the engine cover 15 and the top cover 27 places few restrictions on the arrangement of the joining protrusions 15e, 28e, 27f and 28f. Consequently, the degree of freedom of arranging the joining protrusions 15e, 28e, 27f and 28f is large. Thus, the joining protrusions 15e, 28e, 27f and 28f can be arranged in an optimum arrangement in case the top cover 27 is large, in case the air-intake space 40, the upstream intake passage 51, the inlet ventilation passage 71 and the outlet ventilation passage 81 are formed in the space between the engine cover 15 and the top cover 27, in case the engine cover 15 and the top cover 27 need to be highly rigid, and in case the load acting on the engine cover 15 when the grip 130 is gripped needs to be distributed.

The engine cover 15 does not need to be enlarged vertically to ensure the high rigidity of the joining protrusions connecting the engine cover 15 and the top cover 28. Any large mold is not necessary for forming the engine cover 15, and the engine cover 15 can be formed at reduced cost.

The intermediate cover 28 is provided with the ducts 55, 56, 76 and 85 respectively forming the upstream inlet passage 51i, the upstream outlet passage 51o, the outlet passage 71o and the inlet passage 81i connecting the interior and the exterior of the engine compartment R. The ducts 55 and 56 extend upward in the upstream intake passage 51, the duct 76 extends upward in the inlet ventilation passage 71 and the duct 85 extends upward in the outlet ventilation passage 81. Therefore the ducts 55, 56, 76 and 85 are capable of stopping water. The engine cover 15 has a simple shape as compared with a shape in which the engine cover 15 is formed with those ducts, and hence the engine cover can be manufactured at a reduced manufacturing cost.

The upstream expansion chamber 51a through which intake air for the internal combustion engine E flows is formed in the upstream intake passage 51 by the intermediate cover 28 and the top cover 27. The engine cover 15 has a simple shape as compared with a shape in which the engine cover 15 is used for forming the upstream expansion chamber 51a, and hence the engine cover 15 can be manufactured at a reduced manufacturing cost. Since the upstream expansion chamber 51a is spaced apart upward from the engine compartment R in which intake air is heated by the internal combustion engine E by a distance corresponding to the distance between the engine cover 15 and the intermediate cover 28 or the thickness of the air-intake space 40, heating of intake air in the upstream expansion chamber 51a by heat radiated from the internal combustion engine E can be suppressed. Consequently, the engine E can operate at increased volumetric efficiency.

Ventilation air flows through the inlet ventilation passage 71 into the engine compartment R to ventilate the engine compartment R. Since the inlet ventilation passage 71 is spaced apart from the engine compartment R in which intake air is heated by the engine E, by a distance corresponding to the distance between the engine cover 15 and the intermediate cover 28 or the thickness of the air-intake space 40, heating of ventilation air in the inlet ventilation passage 71 by heat radiated from the internal combustion engine E can be suppressed. Consequently, the engine E can be cooled effectively by ventilation air.

The sealing member 140 clamped between the circumferential edge 15m of the top wall 15b and the downstream entrance duct 62 joined together to form the opening 15c and the downstream inlet passage 61i has the sealing lip 142 pressed closely against the joining surface J1 of the circumferential edge 15m, the flexible circumferential side part 144 that is bent or curved elastically when the lip 142 is pressed against the joining surface J1, and the inside surface 145 exposed to the connecting passage 141 and being subjected to the pressure of intake air. The inside surface 145 of the sealing member 140 has the sealing surface 145a. The sealing surface 145a faces the joining surface J1 in a direction in which a negative suction pressure acts in a state where the lip 142 is in close contact with the joining surface J1 and where the negative suction pressure is not acting on the inside surface 145. When the negative suction pressure acts on the sealing surface 145a, the lip 142 is pressed against the joining surface J1. Since the flexible circumferential side part 144 bends elastically when the lip 142 is thus depressed by the joining surface J1, the circumferential edge 15m and the downstream entrance duct 62 can be reliably connected by the sealing member 140, and the circumferential edge 15m, which is a part of the intermediate cover 28, and the downstream entrance duct 62 included in the downstream intake silencer 60 can be easily connected. Thus connecting work for connecting the circumferential edge 15m and the downstream entrance duct 62 is facilitated. The negative suction pressure acting on the sealing surface 145a presses the lip 142 against the joining surface J1. Thus, the sealing effect of the lip 142 can be enhanced by the negative suction pressure in the connecting passage 141.

The sealing surface 145a and the joining surface J1 forms the space 141a continuous with the connecting passage 141 before the negative suction pressure acts on the circumferential side surface 145a. Since the negative suction pressure acting on the circumferential side surface 145a presses the lip 142 against the joining surface J1, the negative suction pressure of intake air flowing through the connecting passage 141 enhances the sealing effect of the lip 142. The space 141a formed when the flexible circumferential side part 144 bends increases the area of the sealing surface 145a.

The sealing member 140 is provided with the hollow 146, the lip 142 is flexible, and the flexible circumferential side part 144 has the thin wall 144a capable of being easily bent. The sealing part of the lip 142 comes into close contact with the joining surface J1. Therefore, the sealing part can deform easily, which facilitates the connecting work. Since the hollow 146 in the sealing member 140 forms the thin wall 144a of the flexible circumferential side part 144, the flexible circumferential part 144 can be easily formed. When the flexible circumferential side part 144 is bent, the volume of the hollow 146 is reduced. Consequently, the lip 142 is pressed firmly against the joining surface J1 by the pressure of the gas filling up the hollow 146 to enhance the sealing effect of the sealing member 140.

The outboard motor S includes the engine cover 15 forming the engine compartment R holding the internal combustion engine E provided with the intake system 30 for carrying intake air to the combustion chambers 22 formed in the engine body, the intermediate cover 28 covering the engine cover 15 from above, the top cover 27 covering the intermediate cover from above, and the upstream intake silencer 50 through which intake air for combustion taken in through the air-intake opening 42 flows to the intake system 30. The upstream intake silencer 50 is disposed outside the engine compartment R and is spaced apart from the engine cover 15 so that the air-intake space 40 having the air-intake opening 42 is formed. The upstream intake silencer 50 has the upstream entrance duct 55 forming the upstream inlet passage 51i into which intake air flows from the air-intake space 40 and spaced apart from the engine cover 15, the structure 57 forming the upstream expansion chamber 51a into which intake air flows through the upstream inlet passage 51i, and the upstream exit duct 56 forming the upstream outlet passage 51o through which intake air flows into the intake system 30. The upstream end 51i1 of the upstream inlet passage 51i opens into the air-intake space 40. The air-intake opening 42 is at a level lower than that of the upstream end 51i1 of the upstream inlet passage 51i. The air-intake opening 42 extends on the rear, right and left sides of the upstream intake silencer 50 or the upstream expansion chamber 51a in a plane.

The upstream intake silencer 50 disposed outside the engine compartment R attenuates intake pulsation propagating from the intake system 30. Since the upstream intake silencer 50 is separated upward from the engine cover 15 by the air-intake space 40, the transmission of intake pulsation from the intake system 30 to the air-intake space 40 is suppressed, so that noise resulting from the vibration of the engine cover 15 forming the air-intake space 40 is reduced.

Since the air-intake opening 42 extends on the rear, right and left sides of the upstream intake silencer 50 or the upstream expansion chamber 51a in a plane, the air-intake space has an increased length. Therefore, the air-intake opening 42 can be formed in the small width W while the air-intake opening 42 ensures taking external air in at a necessary intake rate. Since the air-intake opening 42 has the small width W, the high effect of the air-intake opening 42 on suppressing the entrance of water and foreign matters into the air-intake space 40 can be ensured.

Since the air-intake opening 42 is at a level lower than that of the upstream inlet passage 51i, and the upstream entrance duct 55 is spaced apart from the engine cover 15 and does not extend upward from the engine cover 15, the upstream entrance duct 55 places few restrictions on designing the shape of the top wall 15b demarcating the air-intake space 40 of the top cover 15 and hence the degree of freedom of designing the top wall 15b is large.

Since the downstream end 51o2 of the upstream outlet passage 51o are on the rear side of the upstream end 51i1 of the upstream inlet passage 51i in the air-intake space 40, it is difficult for water that has entered the air-intake space 40 from the rear to flow through the upstream end 51i1 into the upstream inlet passage 51i. Thus, water is restrained from flowing into the upstream intake silencer 50.

The structure 57 included in the upstream intake silencer 50 has the lower wall 53 separated from the engine cover 15 by the air-intake space 40, and the upstream entrance duct 55 does not extend downward from the lower wall 53 and extends upward from the lower wall 53 into the upstream expansion chamber 51a. Therefore, water is restrained from flowing through the upstream inlet passage 51i into the upstream intake silencer 50. Since the upstream entrance duct 55 extends upward into the upstream expansion chamber 51a, the upstream intake silencer 50 can be disposed vertically close to the engine cover 15 and hence the outboard motor S can be formed in reduced vertical size.

Since the upstream entrance duct 55 does not extends downward from the lower wall 53, a part around the upstream inlet passage 51i of the lower wall 53 can be placed close to the engine cover 15. Thus, the upstream expansion chamber 51a can be formed in an enlarged volume without disposing the upstream intake silencer 50 at a high level relative to the engine cover 15. Consequently, the outboard motor S can be formed in reduced vertical size, and the upstream expansion chamber 51a of a large volume enhances the intake noise reducing effect of the upstream intake silencer 50.

The engine cover 15 has the right side wall 15t and the left side wall 15s facing the right and the left side part, respectively, of the air-intake opening 42. The air-intake space 40 has the right rising space 40t defined by the intermediate cover 28 and the right side wall 15t, and the left rising space 40s defined by the intermediate wall 28 and the left side wall 15s. The right rising space 40t and the left rising space 40s extend upward from the air-intake opening 42. The right rising space 40t extends between the right side part of the air-intake opening 42 and the upstream inlet passage 51i, and the left rising space 40s extends between the left side part of the air-intake opening 42 and the upstream inlet passage 51i. Respective upper parts of the rising spaces 40t and 40s connect to the upper part 40i of the air-intake space 40 into which the upstream inlet passage 51i opens. Therefore, water flowing through the air-intake opening 42 into the air-intake space 40 impinges on and adheres to the side walls 15t and 15s, and hence the amount of water that rises in the rising spaces 40t and 40s is limited. Thus, water is prevented from entering the upstream intake silencer 50.

The right and left side parts of the air-intake opening 42 on the right and left sides of the upstream end 51i1 and the downstream end 51o2 of the upstream outlet passage 51o extend longitudinally beyond the front and rear ends of the longitudinal range Y in which the upstream end 51i1 and the downstream end 51o2 are arranged. Thus, the air-intake opening 42 extending around the lower end of the air-intake space 40 can be formed in an increased length. Therefore, even though the air-intake opening 42 is formed in the small width W, and the entrance of water and foreign matters into the air-intake space 40 can be prevented.

The upstream end 51i1 of the upstream inlet passage 51i, and the downstream end 51o2 of the upstream outlet passage 51o are spaced part from each other with respect to the longitudinal direction and are on the front and left sides, respectively, of the center axis Le. Therefore, the air-intake opening 42 can be formed in an increased length and the small width W, so that water and foreign matters can be prevented from entering the air-intake space 40.

The outboard motor S includes the engine cover 15 forming the engine compartment R holding the internal combustion engine E provided with the intake system 30 for carrying intake air into the combustion chambers 22 formed in the engine body, the intermediate cover 28 covering the engine cover 15 from above, and the top cover 27 covering the intermediate cover 28 from above. The engine cover 15, the top cover 27 and the intermediate cover 28 define the air-intake space 40 opening into the air-intake opening 42. The upstream ends 51i1 and 61i1 through which air flows from the air-intake space 40, and downstream ends 51o2 and 61o2 through which intake air flows from the upstream ends 51i1 and 61i1 into the intake system 30 disposed in the engine compartment R are formed in the air-intake space 40. The upstream intake silencer 50 is disposed in the air-intake space 40. The air-intake opening 42 is extended on the right and left sides of the upstream end 51i1 in a longitudinal range from a position corresponding to the cylinder heads 2 and the valve covers 3 to a position on the front side of the center axis Le.

Since the upstream intake silencer 50 is interposed between the intake system 30 disposed in the engine compartment R and the air-intake space 40, intake pulsation transmitted from the intake system 30 to the air-intake space 40 is attenuated and noise resulting from the vibration of the engine cover 15 defining the air-intake space 40 is reduced.

The right and left side parts of the air-intake opening 42 extend longitudinally on the right and left sides of the upstream end 51i1 in a longitudinal range from a position corresponding to the cylinder heads 2 and the valve covers 3 to the position on the front side of the center axis Le. Therefore, the air-intake opening 42 can be formed in increased length and the small width W and a necessary intake rate can be ensured, the effect of the air-intake opening 42 on suppressing the entrance of water and foreign matters into the upstream intake silencer 50 can be enhanced, and the entrance of water and foreign matters into the upstream intake silencer 50 can be effectively prevented, and the flow of water together with intake air through the upstream end 51i1 into the upstream intake silencer 50 can be effectively prevented.

The air-intake opening 42 opens rearward at the rear end of the air-intake space 40, and the respective downstream ends 51i2 and 61i2 of the inlet passages 51i and 61i are disposed on the rear side of the upstream ends 51i1 and 61i1, respectively. Since the upstream ends 51i1 and 61i1 are on the front side of the downstream ends 51i2 and 61i2 in the air-intake space 40, it is difficult for water that has passed into the air-intake space 40 to flow through the upstream ends 51i1 and 61i1 into the inlet passages 51i and 61i, and hence the entrance of water into the upstream intake silencer 50 is prevented.

Water that has flowed into the air-intake space 40 is drained in lateral directions from the air-intake space 40. Therefore, the flow of water through the inlet passages 51i and 61i into the intake silencers 50 and 60 together with intake air can be effectively suppressed.

The top cover 15 has the protruding part 15p protruding upward into the air-intake space 40 at the same lateral position as the upstream end 51i1 between the air-intake opening 42 and the upstream inlet end 51i1 with respect to the longitudinal direction. The protruding part 15p prevents the water that has entered the air-intake space 40 from the rear through the air-intake opening 42 from reaching the upstream end 51i1 of the upstream inlet passage 51i. Thus the flow of water into the upstream intake silencer 50 is prevented.

The upstream end 51i1 and the downstream end 51o2 of the outlet passage 51o are longitudinally spaced apart from each other and are disposed on the front and rear sides, respectively, of the center axis Le of the crankshaft 8, and the air-intake opening 42 extends longitudinally on the right and left sides of the upstream end 51i1 and the downstream end 51o2 of the upstream outlet passage 51o beyond the opposite longitudinal ends of the range Y in which the upstream end 51i1 and the downstream end 51o2 are arranged. Therefore, the air-intake opening 42 can be formed in an increased length and hence the air-intake opening can be formed in the small width W to prevent the entrance of water and foreign matters into the air-intake space 40.

The outboard motor S includes the internal combustion engine E provided with the intake system 30 for carrying intake air to the combustion chambers 22 formed in the engine body, the engine cove 15 forming the engine compartment R holding the internal combustion engine E, the intermediate cover 28 covering the engine cover 15 from above, and the top cover 27 covering the intermediate cover from above. The engine cover 15, the top cover 27 and the intermediate cover 28 form the air-intake space 40 having the air-intake opening 42 through which intake air is taken in. The outboard motor S is provided with the upstream intake silencer 50 through which intake air for combustion taken in through the air-intake opening 42 flows to the intake system 30 disposed inside the engine compartment R. The upstream intake silencer 50 is disposed outside the engine compartment R. The intake system 30 includes the downstream intake silencer 60 into which intake air flows from the upstream intake silencer 50, and the throttle device 31 into which intake air flows from the downstream intake silencer 60. The upstream intake silencer 50 is provided with an upstream inlet passage 51i opening into the air-intake space 40 to receive intake air from the air-intake space 40, the upstream outlet passage 51o through which intake air flows from the upstream intake silencer 50 into the downstream intake silencer 60 The downstream intake silencer 60 is provided with the downstream inlet passage 61i connected to the upstream outlet passage 51o, and the downstream outlet passage 61o through which intake air flows from the downstream intake silencer 60 into the throttle passage 33 of the throttle device 31. The upstream inlet passage 51i is on the front side of the upstream outlet passage 51o. The downstream outlet passage 61o is on the opposite side of the upstream inlet passage 51i with respect to the upstream outlet passage 51o and the downstream inlet passage 61i.

The intake system 30 disposed in the engine compartment R includes the downstream intake silencer 60, and the upstream intake silencer 50, through which intake air flows into the downstream intake silencer 60, is disposed outside the engine compartment R. Intake pulsation transmitted from the intake system 30 is attenuated by the upstream intake silencer 50 and hence intake noise is reduced.

The upstream inlet passage 51i of the upstream intake silencer 50 opening into the air-intake space 40 formed outside the engine compartment R is on the front side of the upstream outlet passage 51o. Therefore, when the air-intake opening 42 opens rearward at the rear end of the air-intake space 40, the upstream inlet passage 51i is a large longitudinal distance apart from the air-intake opening 42, and hence water that has flowed into the air-intake space 40 is prevented from flowing into the upstream intake silencer 50. Thus, the flow of water together with intake air into the upstream intake silencer 50 can be effectively prevented.

The downstream outlet passage 61o is on the longitudinally opposite side of the upstream inlet passage 51i with respect to the upstream outlet passage 51o and the downstream inlet passage 61i. Therefore, intake air flows smoothly from the upstream inlet passage 51i through the upstream outlet passage 51o and the downstream inlet passage 61i into the downstream outlet passage 61o, and resistance to the flow of intake air is low. Consequently, volumetric efficiency is high and the internal combustion engine E can achieve high output performance.

The upstream outlet passage 51o, the downstream inlet passage 61i and the downstream outlet passage 61o are arranged across the straight line La crossing the upstream inlet passage 51i and the throttle passage 33 in a plane. The upstream inlet passage 51i, the upstream outlet passage 51o, the downstream inlet passage 61i, the downstream outlet passage 61o and the throttle passage 33 are on a straight line in a plane. Therefore, the flow of intake air from the upstream inlet passage 51i, the upstream outlet passage 51o and the downstream inlet passage 61i into the downstream outlet passage 61o, i.e., the flow of intake air through the upstream intake silencer 50 and the downstream intake silencer 60, does not meander laterally. Consequently, intake resistance is low and the internal combustion engine E can operate at high volumetric efficiency.

The throttle passage 33 extends longitudinally along the straight line La in a plane. Therefore, resistance exerted by the passage through the upstream intake silencer 50 and the downstream intake silencer 60 to the throttle device 31 on the flow of intake air is low, and hence the internal combustion engine E operates at high volumetric efficiency.

The upstream intake silencer 50 is separated from the engine cover 15 by the air-intake space 40. Therefore, the transmission of intake pulsation from the intake system 30 to the air-intake space 40 is suppressed, and noise resulting from the vibration of the engine cover 15 forming the air-intake space 40 is reduced.

The ventilation system forming the outer outlet ventilation space 81 for ventilating the engine compartment R includes the case 92 disposed in the engine compartment R, and the fan 93 placed in the inner outlet ventilation space 91 connecting to the outer outlet ventilation space 81 to ventilate the engine compartment R. The inner outlet ventilation space 91 has the inlet ventilation passage 91i formed in the upper space Ra in the engine compartment R and opening upward. Thus, the inlet passage 91i of the inner outlet ventilation space 91 in which the fan 93 for discharging air from the engine compartment R of the outboard motor S through the outer outlet ventilation space 81 outside the engine compartment R is formed in the upper space Ra in the engine compartment R and opens upward. Therefore, the fan can efficiently suck high-temperature air that has cooled the internal combustion engine E from the upper space Ra, in which high-temperature air collects, in the engine compartment R and can efficiently discharge high-temperature air to the outside of the engine compartment R, i.e., outside the outboard motor S. Consequently, the engine compartment R can be ventilated at high efficiency, the internal combustion engine E can be effectively cooled by the ventilation air, and temperature rise in the engine compartment R can be effectively suppressed.

The alternator G and the air guide structure D forming the guide passage 129 are disposed in the engine compartment R. High-temperature air that has worked for cooling the alternator G flows through the guide passage 129 formed by the air guide structure D into the inlet ventilation passage 91i in which the fan 93 is disposed. Thus, the diffusion of ventilation high temperature air in the engine compartment R is prevented, ventilation air can be efficiently sucked into the fan 93, the internal combustion engine E can be effectively cooled, and the rise of the temperature in the engine compartment R can be effectively suppressed.

The inner outlet ventilation space 91 formed in the engine compartment R and the outer outlet ventilation space 81 formed outside the engine compartment R are at the same longitudinal position near the alternator G. Therefore, the inner outlet ventilation space 91 can be formed in a narrow range Y and hence the engine cover 15 may be small, which is effective in forming the outboard motor S in small size.

The ventilation system having the outer outlet ventilation space 81 formed outside the engine compartment R has the fan 93 placed in the inner outlet ventilation space 91 for delivering air by pressure from the engine compartment R to the outer outlet ventilation space 91, and the air guide structure D for delivering cooling air that has worked for cooling the alternator G through the outer outlet ventilation space 81 to the inlet ventilation passage 91i of the inner outlet ventilation space 91. The fan 93 for discharging air from the engine compartment R of the outboard motor S to the outside of the engine compartment R is placed in the outer outlet ventilation space 91 connecting to the upstream end of the outer outlet ventilation space 81, and the alternator G is surrounded by the air guide structure D for guiding high-temperature cooling air that has worked for cooling the alternator G disposed in the engine compartment R to the inlet ventilation passage 91i of the inner outlet ventilation space 91 surrounds. Therefore, the diffusion of the cooling air that has worked for cooling the alternator G in the engine compartment R is prevented, the fan can suck the cooling air efficiently, the alternator G can be effectively cooled by ventilation air, and temperature rise in the engine compartment R can be effectively suppressed.

The air guide structure D has the cover 111 surrounding the housing 102 of the alternator G, and a guide wall forming the guide passage 129 for guiding air discharged from the guide space 113 formed by the guide cover 111 and the housing 102 to the inlet ventilation passage 91i. The guide passage 129 is formed by the combination of the guide wall 121 and the engine cover 15. Thus, the guide passage 129 for guiding the air discharged into the guide space 113 formed by the guide cover 111 of the air guide structure D to the inlet ventilation passage 91i of the inner outlet ventilation space 91 is formed by the combination of the guide wall 121 of the air guide structure D, and the engine cover 15. Since the engine cover 15 is used for forming the guide passage 129 for guiding the discharged air to the fan 93, the air guide structure D having the guide wall 121 is a small, lightweight structure, the engine cover 15 is small and the outboard motor S can be formed in small size.

Since the inlet ventilation passage 91i is formed in the upper space Ra and opens upward, the fan 93 can efficiently suck the high-temperature air which has worked for cooling the internal combustion engine E and which collected in the upper space Ra and can efficiently discharge the high-temperature air to the outside from the engine compartment R, i.e., from the outboard motor S. Thus, the engine compartment R can be efficiently ventilated, and ventilation air can effectively coo the internal combustion engine E and can effectively suppress the rise of the temperature in the engine compartment R.

The guide space 113 is formed by the guide cover 111 and has the discharge opening 114 through which air is discharged into the engine compartment R toward the inner outlet ventilation space 91. The inlet ventilation passage 91i is disposed above the discharge opening 114. The guide wall 121 has the inclined part 122 sloping upward to guide air discharged through the discharge opening 114 toward the inlet ventilation passage 91i. Therefore, air discharged from the alternator G flows through the discharge opening 114 of the guide cover 111 toward the inlet ventilation passage 91i of the inner outlet ventilation space 91 in which the fan 93 is placed. Since the inclined part 122 of the guide wall 121 deflects the flow of air toward the inlet ventilation passage 91i at a level higher than that of the discharge opening 114, the discharged ventilation air flowing through the guide passage 129 defined by the combination of the engine cover 15 and the guide wall 121 entrains high-temperature air heated in the engine compartment R and rising in the engine compartment R toward the inlet ventilation passage 91i. Consequently, the discharged ventilation air and the high-temperature air in the engine compartment R are sucked efficiently by the fan 93. Thus, the ventilation air can effectively cool the alternator G and can effectively suppress temperature rise in the engine compartment R.

The fan 93 is mounted on the crankshaft 8 of the internal combustion engine E. The outlet passage 81o opening into the atmosphere of the outer outlet ventilation space 81 is on the front side of the center axis Le of the crankshaft 8. Since the outlet passage 81o, through which the air discharged from the engine compartment R by the fan 93 placed in the inner outlet ventilation space 91 flows into the atmosphere, is on the front side of the center axis Le, the outlet passage 81o will not be stopped up with air waves propagating forward, and hence air from the engine compartment R can be efficiently discharged from the outboard motor S.

The ventilation system includes the fan 93, and the case 92 forming the inner outlet ventilation space 91. The air guide structure D and the exit ventilation structure 90 are united. Thus, the fan 93, the exit ventilation structure 90 including the case 92 forming the inner outlet ventilation space 91, and the air guide structure D for guiding the air discharged from the alternator G to the inlet ventilation passage 91i of the inner outlet ventilation space 91 are united together. Thus, the alternator G, the fan 93 and inlet ventilation passage 91i can be disposed close to each other. Therefore, diffusion of discharged air in the engine compartment R can be efficiently prevented, and the air guide structure D and the exit ventilation structure 90 for guiding the discharged air to the fan 93 can be formed in small, lightweight structures.

Modifications made in the outboard motor S in the preferred embodiment will be described.

A part of the upstream intake silencer 50 is the top cover 27 in the foregoing embodiment. The upstream intake silencer 50 may be formed of members separate from the top cover 27.

The air-intake opening 42 may be formed at least on one side with respect to the lateral direction of the upstream ends 51i1 and 61i1. The rear end of the air-intake space 40 does not necessarily be open to the air-intake opening 42 and may be closed. When the rear end of the air-intake space 40 is closed, intake air for combustion is taken into the air-intake space 40 through the longitudinal side parts or one of the longitudinal side parts of the air-intake opening 42.

The internal combustion engine E may be a V-type internal combustion engine other than the V-type four-stroke water-cooled six-cylinder internal combustion engine, an in-line multiple-cylinder internal combustion or a single-cylinder internal combustion engine.

What is claimed is:

1. An outboard motor having an internal combustion engine with a combustion chamber, said outboard motor comprising:
 an upstream intake silencer receiving intake air for combustion; and
 a downstream intake silencer through which the intake air from the upstream intake silencer flows into the combustion chamber;
 wherein the upstream intake silencer and the downstream intake silencer are disposed such that the upstream intake silencer is superposed above the downstream intake silencer,
 the upstream intake silencer has an upstream inlet passage, an upstream expansion chamber and an upstream outlet passage,
 the downstream intake silencer has a downstream inlet passage connected to the upstream outlet passage, a downstream expansion chamber and a downstream outlet passage,
 the upstream expansion chamber has a lower wall of a stepped shape including a raised part which overlaps the downstream intake silencer in a plane and a lowered part which extends without overlapping with the downstream intake silencer in a plane and at a level lower than that of the raised part, and
 the upstream inlet passage and the upstream outlet passage of the upstream intake silencer are formed in the lowered part and the raised part of the lower wall, respectively,
 wherein an air-intake space for introducing external air extends below and along the lower wall of the upstream expansion chamber and is connected to the upstream inlet passage of the upstream expansion chamber to supply the external air into the upstream inlet passage, and
 wherein the downstream expansion chamber has a stepped upper wall including a raised part and a lowered part which underlies the lower wall of the upstream expansion chamber in a plane and which extends at a level lower than that of the raised part of the stepped upper wall, and the downstream inlet passage is formed in the lowered part of the upper wall.

2. The outboard motor according to claim 1 further comprising an engine cover forming an engine compartment holding the internal combustion engine therein, wherein
 the upstream intake silencer and the downstream intake silencer are disposed opposite to each other with respect to the engine cover,
 the air-intake space is formed outside the engine compartment by the engine cover and cover means covering the engine cover from above,
 the upstream intake silencer is disposed in the air-intake space, and
 the downstream intake silencer is disposed in the engine compartment.

3. The outboard motor according to claim 1 further comprising:
 an engine cover forming an engine compartment for holding the internal combustion engine having the combustion chamber therein,
 an intake system disposed in the engine compartment to carry intake air for combustion from the downstream intake silencer to the combustion chamber, and
 cover means covering the engine cover from above; wherein
 the upstream intake silencer is disposed outside the engine compartment and is spaced apart from the engine cover such that the air-intake space having an air-intake opening is formed between the upstream intake silencer and the engine cover,
 the upstream intake silencer has an upstream entrance duct opening into the air-intake space and forming the upstream inlet passage through which intake air taken in through the air-intake opening flows into the air-intake space, walls defining the upstream expansion chamber, and an upstream exit duct forming the upstream outlet passage through which intake air flows into the intake system, the upstream inlet passage has an upstream end opening into the air-intake space, and the air-intake opening is at a level lower than that of the upstream end of the upstream inlet passage and extends on right, left and rear sides of the upstream intake silencer.

4. The outboard motor according to claim 3, wherein the upstream outlet passage is on a rear side of the upstream end of the upstream inlet passage.

5. The outboard motor according to claim 3, wherein the lower wall of the upstream expansion chamber and the engine cover are on vertically opposite sides, respectively, of the air-intake space, and the upstream entrance duct projects upward only from the lower wall into the upstream expansion chamber.

6. The outboard motor according to claim 3, wherein the engine cover has right and left side walls facing the air-intake opening, the air-intake space is defined by the cover means and the side walls and has rising spaces rising upward from the air-intake opening, the rising spaces lie between a right side part of the air-intake opening and the inlet passage and between a left side part of the air-intake opening and the inlet passage, respectively, with respect to lateral directions, and the rising spaces connect to an upper part of the air-intake space into which the inlet passage opens.

7. The outboard motor according to claim 3, wherein the air-intake opening extends longitudinally on right and left sides of an upstream end of the upstream inlet passage and a downstream end of the upstream outlet passage beyond opposite longitudinal ends of a range in which the upstream end of the upstream inlet passage and the downstream end of the upstream outlet passage are arranged.

8. The outboard motor according to claim 3, wherein an upstream end of the upstream inlet passage and a downstream end of the outlet passage are longitudinally spaced apart from each other and are disposed on front and rear sides, respectively, of a center axis of an output shaft of the internal combustion engine.

9. The outboard motor according to claim 1 further comprising:

an engine cover forming an engine compartment for holding the internal combustion engine therein, an intake system disposed in the engine compartment to carry intake air from the downstream intake silencer to the combustion chamber, and cover means covering the engine cover from above, wherein the upstream intake silencer is disposed outside the engine compartment such that the air-intake space having an air-intake opening is formed between the upstream intake silencer and the engine cover, the intake system includes a throttle device into which intake air flows from the downstream intake silencer, the upstream intake silencer has the upstream inlet passage opening into the air-intake space to receive intake air from the air-intake space, and the outlet passage through which intake air flows from the upstream intake silencer into the downstream intake silencer, the downstream intake silencer has the downstream inlet passage connecting to the upstream outlet passage of the upstream intake silencer, and the downstream outlet passage through which intake air flows from the downstream intake silencer into a throttle passage formed in the throttle device, the upstream inlet passage of the upstream intake silencer is on a front side of the upstream outlet passage, and the downstream outlet passage of the downstream intake silencer is disposed on an opposite side of the upstream inlet passage of the upstream intake silencer with respect to the upstream outlet passage of the upstream intake silencer and the downstream inlet passage of the downstream intake silencer.

10. The outboard motor according to claim 9, wherein the upstream outlet passage of the upstream inlet passage the downstream inlet passage of the downstream intake silencer and the downstream outlet passage of the downstream intake silencer are so arranged as to intersect a straight line intersecting the upstream inlet passage and the throttle passage in a plane.

11. The outboard motor according to claim 10, wherein the throttle passage extends longitudinally or along the straight line in a plane.

* * * * *